US007861228B2

(12) United States Patent
Osecky et al.

(10) Patent No.: US 7,861,228 B2
(45) Date of Patent: Dec. 28, 2010

(54) VARIABLE DELAY INSTRUCTION FOR IMPLEMENTATION OF TEMPORAL REDUNDANCY

(75) Inventors: Benjamin Daniel Osecky, Fort Collins, CO (US); Blaine Douglas Gaither, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1506 days.

(21) Appl. No.: 11/075,991

(22) Filed: Mar. 9, 2005

(65) Prior Publication Data

US 2005/0172196 A1    Aug. 4, 2005

Related U.S. Application Data

(63) Continuation-in-part of application No. 10/726,976, filed on Dec. 3, 2003.

(51) Int. Cl.
*G01R 31/28* (2006.01)

(52) U.S. Cl. .......................................... 717/126; 714/21
(58) Field of Classification Search ........................ None
See application file for complete search history.

(56) References Cited

U.S. PATENT DOCUMENTS

| 5,517,628 | A  | * | 5/1996  | Morrison et al.  | 712/234 |
| 6,058,491 | A  | * | 5/2000  | Bossen et al.    | 714/15  |
| 6,550,015 | B1 | * | 4/2003  | Craycraft et al. | 713/502 |
| 7,308,607 | B2 | * | 12/2007 | Reinhardt et al. | 714/25  |
| 7,318,169 | B2 | * | 1/2008  | Czajkowski       | 714/17  |
| 7,380,192 | B1 | * | 5/2008  | Nicolaidis       | 714/746 |
| 2005/0105639 | A1 | * | 5/2005 | Tahara et al.    | 375/295 |

FOREIGN PATENT DOCUMENTS

| JP | 60-198645   | 10/1985 |
| JP | 62-293441   | 12/1997 |
| JP | 10-11309    | 10/1998 |
| JP | 2003-316559 | 11/2003 |

OTHER PUBLICATIONS

George Varghese and Tony Lauck, Hashed and Hierarchical Timing Wheels: Efficient Data Structures for Implementing a Timer Facility, IEEE/ACM Transactions on Networking, Dec. 1997, vol. 5, No. 6, p. 824-34, 26 refs, CODEN: IEANEP, ISSN: 1063-6692, Publisher: IEEE; ACM, USA.*
Eric Rotenberg, Ar-smt: Coarse-grain time redundancy for high performance general purpose processors, Univ. of Wisc. Course Project (ECE753), 1998.*

(Continued)

*Primary Examiner*—Lewis A Bullock, Jr.
*Assistant Examiner*—Chris Nelson

(57) ABSTRACT

A method for detecting computational errors in a digital processor executing a program. The program is divided into a plurality of computation sections, and two functionally identical code segments, respectively comprising a primary segment and a secondary segment, are generated for one of the computation sections. The primary segment is executed, after which a temporal diversity timer is started. The secondary segment is then executed upon expiration of the timer. The respective results of execution of the primary segment and the secondary segment are compared after completion of execution of the secondary segment, and an error indication is provided if the respective results are not identical.

33 Claims, 11 Drawing Sheets time →

| Execute section A primary code 1101 | Start timer 1 1102 | | Timer 1 expires; reset timer 1 1105 | Execute section A secondary & checking code 1106 |

| Execute section B primary code 1103 | Start timer 2 1104 | | Timer 2 expires; reset timer2 1109 | Execute section B secondary & checking code 1110 |

| Start timer 3 1107 | Execute section C primary code 1108 | | Timer 3 expires; reset timer 3 1111 | Execute section C secondary & checking code 1112 |

OTHER PUBLICATIONS

Eric Rotenberg, AR-SMT: a microarchitectural approach to fault tolerance in microprocessors Fault-Tolerant Computing, 1999. Digest of Papers. Twenty-Ninth Annual International Symposium on Jun. 15-18, 1999 pp. 84-91.*

Gurindar Sohi, Manoj Franklin, Kewal Saluja, A study of time-redundant fault tolerance techniques forhigh-performance pipelined computers, Fault-Tolerant Computing, 1989. FTCS-19. Digest of Papers., Nineteenth International Symposium Publication Date: Jun. 21-23, 1989, on pp. 436-443.*

Nahmsuk Oh and Philip P. Shirvani and Edward J. Mccluskey, Error detection by duplicated instructions in super-scalar processors, IEEE Transactions on Reliability, 2002, vol. 51, pp. 63-75.*

Oh, N., P. P. Shirvani, and E. J. McCluskey, "Error Detection by Duplicating Instructions in Super-scalar Processors," CRC TR 00-5, Apr. 2000. Available from http://crc.stanford.edu/bibliography.html.*

Mukherjee, Shubhendu S.; Kontz, Michael, and Reinhardt, Steven K; "Detailed Design and Evaluation of Redundant Mutlithreading Alternative"; 29th Annual International Symposium on Computer Architecture (ISCA) pp. 1-12, 2002.

Mukherjee, Shubu; "An Architectural Perspective on Soft Errors From Cosmic Radiation"; 44th IFIP WG10.4 Workshop on Hardware Design and Dependability, pp. 1-58; Jun. 28, 2003.

Japan Office Action, dated Nov. 22, 2006, 2 pages.

Japan Office Action, dated Apr. 4, 2007, 2 pages.

* cited by examiner

VARIABLE DELAY INSTRUCTION FOR IMPLEMENTATION OF TEMPORAL REDUNDANCY

RELATED APPLICATIONS

This application is a continuation-in-part of application Ser. No. 10/726,976, entitled "FAULT-DETECTING COMPUTER SYSTEM", filed on Dec. 3, 2003, the disclosure of which is herein incorporated by reference.

BACKGROUND

Two classes of hardware-related errors are considered to occur in computational systems: hard errors and soft errors. A hard error is manifested as an improper behavior of the operation of a computer system that persists and continues to cause the system to produce improper behavior and results for a significant period after an initial error occurs. A soft error is a non-recurring error generated by a temporary anomaly in a computer hardware device. Soft errors involve an improper behavior of the computer system that does not persist beyond a certain period of time. After this time has elapsed further operation of the system proceeds normally.

As the physical devices that make up computer systems have become smaller and more numerous, many recurring physical phenomena are now more likely to cause temporary faults in the operation of these devices resulting in the disruption of the operation of the digital logic and state making up a computing system, often resulting in soft errors. Soft errors are generally more difficult to detect than hard errors. Soft errors are assumed to be more frequent than hard errors and are also assumed to occur sufficiently often that their effect should be considered in computer systems design. Undetected soft errors can result in incorrect results being reported as the result of a computation, corrupt data being stored to disk or other persistent media, or transmitted over network connections, or result in anomalous behavior of a program or of the entire computer system. It is desirable to provide error detection coverage for the subsystems of the computer system architecture which have the highest error rates using techniques which provide detection of soft errors and, optionally, of hard errors. These subsystems typically include the system main memory, the various levels of processor caches as well as system TLB (translation lookaside buffers), I/O and interconnection 'fabric'. When an error is detected it is often desirable to provide a way of correcting the error so that the computation can continue to produce a correct result. If an error occurs in one of these subsystems, the error will be detected and corrected before it is delivered to other subsystems, thereby obviating the need for the error to be addressed by the other subsystems. This leaves the uncovered subsystems to be addressed. In many computer system designs large portions of the central processing unit are not covered by error detection or error correction.

With the continuing development of VLSI processors having ever-increasing component density, the susceptibility of these processors to 'soft' errors caused by sources such as cosmic rays and alpha particles is becoming an issue in the design of computational systems. Error detecting and correcting codes are widely applied to the design of computer system memory, caches and interconnection fabric to verify correct operation and to provide correction of the representation of data in the event that either soft or hard errors occur. Protecting the processor electronics is a more difficult task since a processor has many more structures of greater complexity and variety than computer memory devices. Existing hardware techniques for protecting the processor electronics require the design and incorporation of significant logical structures to check, contain and recover from errors which might occur in the core structures that make up the processor.

Other processor-oriented error detection techniques have included providing multiple processors running the same instructions in 'lock step' and associated self-checking hardware to verify that all results visible externally from each processor match the results of each (or a majority) of its peers to ensure correct operation. In implementation of these techniques where the comparisons do not match, additional complexity is required to limit the propagation of any erroneous state. In addition, special procedures must be performed to either rule the result of the computation as invalid or to recover the state of the computation. All of this adds to the cost and complexity of the system design.

Software techniques have also been proposed to address errors in computation. Some of these techniques involve fully executing a program multiple times and comparing the results, and then re-executing the computation until the results match. All of the above techniques multiply the computing resources and time required for a computation to complete. Furthermore, some of these techniques will not detect certain classes of hard errors. Other software fault tolerance techniques assume that a computation will fail in such a way that the computation will stop or 'fail fast', or that errors will be detected by error exception checking logic normally incorporated in processor designs. These techniques often provide inadequate coverage of soft errors.

From the foregoing, it can be seen that methods for detecting improper operation of computer systems often require extensive hardware and software to support the detection of improper operation, to minimize damage resulting from incorrect results due to improper operation, and also to minimize the number and extent of special actions needed to recover and continue processing in the face of a detected fault. Such systems have often employed doubly or triply redundant hardware and extensive checking and correction logic beyond that required for the basic computation environment itself. Alternative software fault tolerance techniques typically require the adoption of specialized programming techniques which can impact the design of system and applications software, or which require multiple executions of a program and subsequent comparison of the results of two or more program executions.

Previously known methods for implementing redundancy in computer systems typically use a 'voting' scheme to determine which of the results of two or more redundant computations is to be used or committed before further execution of a program. However, none of these existing methods provide a mechanism for controlling the relative time between execution of corresponding instructions in each of the redundant computations. Furthermore, these previous methods are generally hardware-based, and require specially-designed processors.

The implementation of existing techniques for detecting soft errors, either hardware- or software-based, thus requires significant additional hardware, software, and/or other resources.

SUMMARY

A method is described for detecting computational errors in a digital processor executing a program. In one embodiment, the program is divided into a plurality of computation sections and two functionally identical code segments, respectively comprising a primary segment and a secondary segment, are generated for one of the computation sections. The primary segment is executed, after which a temporal diversity timer is started. The secondary segment is then executed upon expiration of the timer. The respective results of execution of the primary segment and the secondary segment are compared after completion of execution of the secondary segment, and an error indication is provided if the respective results are not identical.

DETAILED DESCRIPTION

Related systems of software techniques for detection of digital processor-related errors are described herein. When combined with existing computer architectures, these systems provide effective fault detection coverage for a processor. The term 'processor' is used in this document to refer to central processing units ('CPU's) as well as digital processors providing other types of functionality. The fault detection techniques described herein may also be used to provide efficient recovery from detected fault conditions. In exemplary embodiments, the techniques may be employed without requiring modifications to the architecture, structure, or source code of applications programs.

Figure 1:
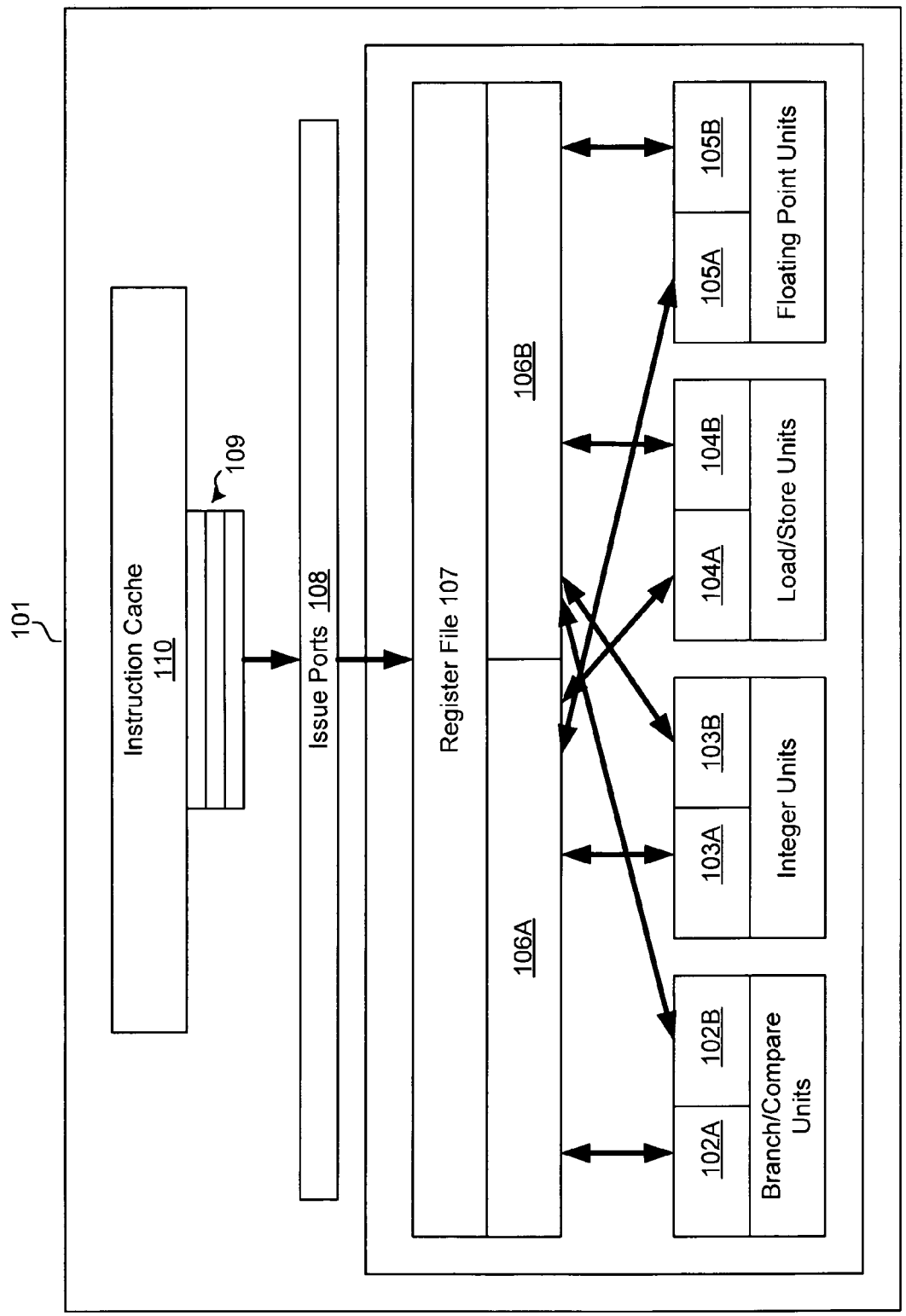
FIG. 1 is a diagram showing certain components of an exemplary VLIW processor (prior art)

FIG. 1 is a block diagram of relevant sections of an exemplary VLIW (Very Long [or Large] Instruction Word) processor 101, such as a Intel Itanium II, that is suitable for use in the present system. VLIW describes an instruction-set philosophy in which a compiler packs a number of basic, non-interdependent operations into the same instruction word. When fetched from cache or memory into the processor, these fixed-length words (instructions) are broken up into several shorter-length instructions which are dispatched to independent functional units (also known as 'execution units'), where they are executed in parallel. In the processor shown in FIG. 1, instructions in instruction cache 110 are queued in instruction queue 109, issued via issue ports 108, and executed via functional units 102-105 using associated registers 106A/106B, described below.

Processor 101 includes two branch/compare units 102A/102B, two integer units 103A/103B, two load/store units 104A/104B, and two floating point units 105A/105B. Each of the functional units has a corresponding register or register set, which is partitioned into two corresponding but separate parts as indicated by partitions 106A and 106B. The two groups of registers 106A/106B are collectively referred to as a 'register file' 107. The present system is capable of functioning without the parallel branch/compare unit 102B, but the examples shown herein assume that two compare units 102A/B are available on processor 101. The use of partitioned registers allows the detection and repair of errors in register file 107 or paths to/from the register file. The present system includes encoding of different register names into redundant instructions (e.g., load, store, compare) to utilize these partitioned registers.

Temporal Replication

Soft errors that affect a processor are primarily a result of physical phenomena (e.g., alpha particles and cosmic rays) which are observed to occur randomly but which have some average rate of occurrence and a probability distribution of event durations during which a system behaves incorrectly, or during which the state of the system is altered. Furthermore, the disruptions are generally confined to a single active device or a cluster of physically adjacent devices on a VLSI chip. The observation can be made that the mean time between occurrences of these events is much greater than the maximum duration of disruption. Furthermore, the probability that the same circuit will be disrupted in the same way by a second event after the effects of the first event have ended is also extremely small; as a result, the possibility of two independent identical sequential errors occurring in the same computation units close together in time can be neglected. Therefore, the technique of temporal replication can be used to create multiple computing domains that can be employed to verify that the computation has not been disrupted in a significant way by a soft error.

From the probability distribution of event durations, a maximum period of disruption, Dmax, can be identified such that the probability that an event duration will be longer than Dmax is small enough that longer durations need not be considered. The average maximum duration of disruptive events due to cosmic rays, alpha particles and other randomly occurring disruptive phenomena dictates a value for Dmax equal to some predeterminable number of processor clock cycles, or other predetermined period of time. The duration of these disruptive events is a function of the particle type and energy along with the properties of the semiconductor processes and design of the devices on the processor chip. Therefore, the actual value for Dmax may be determined for any real processor design. The applicable value for Dmax for a particular processor may be determined by detailed simulation of the soft error causes as part of the design processes, determined by measurement of populations of actual devices that make up the processor, or determined through accelerated error rate measurement techniques. For example, for processors with clock frequencies of approximately 1 gigahertz, Dmax may have a value of several CPU clock cycles.

Figure 2:
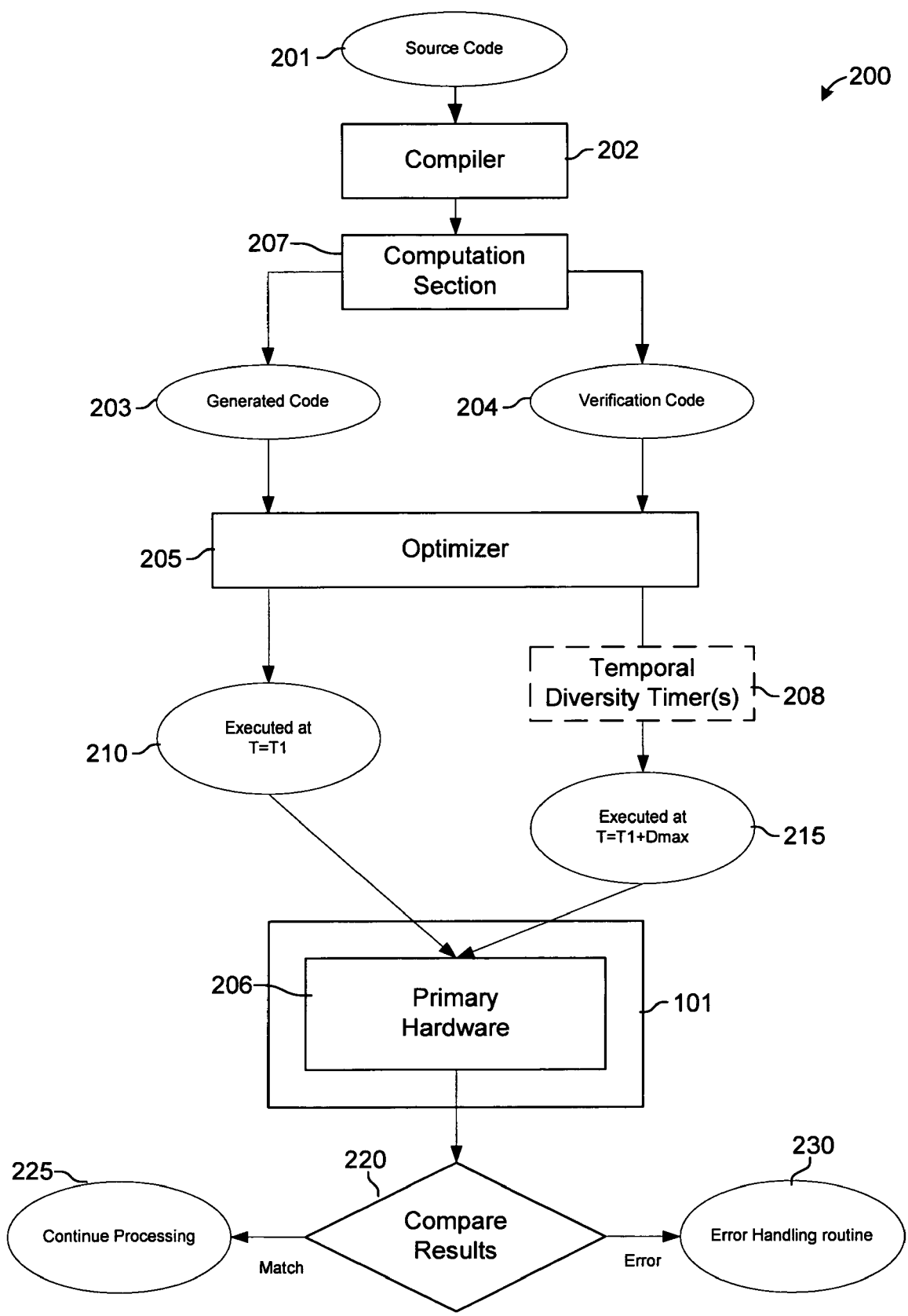
FIG. 2 is a diagram showing exemplary components and process flow for a temporal replication fault detection system.

FIG. 2 is a diagram showing exemplary components and process flow for a temporal replication fault detection system 200. As shown in FIG. 2, the source code 201 for a program of interest is separated into computation sections 207 by compiler 202 based on a model wherein each segment takes a set of inputs, performs computations on the input values, and exposes a set of outputs to further computation. Each computation section 207 is processed by compiler 202 and the resultant generated code 203 is passed to an optimizer 205, which schedules the execution of operations in order to best make use of a particular processor's available resources.

The present method requires no significant modifications to be implemented in a typical compiler prior to the code generation phase. One possible modification comprises the processing of a compiler flag to turn error checking on or off. In the code generation phase (which follows the source code parsing phase), compiler 202 reads an intermediate encoding of the program semantics and performs standard operations including allocating space and resources on the object computer, such as assigning addresses to identifiers and temporaries. In addition to these operations performed by typical compilers, compiler 202 also generates code for operations that allocate and reallocate resources (such as registers), to hold temporary values.

The code generation phase of compiler 202 is modified to generate error handling code 204 which verifies the correct operation of each segment of the program as it is executed. The resources of processor 101 are used in such a manner that the redundant and checking computations are each performed in a different computational domain from the domain performing the initial computation. The error handling code 204 generated by compiler 202 is further structured so that an appropriate action for error containment is taken, and, in an alternative embodiment, recovery action is initiated upon detection of an error.

Present processors typically incorporate multiple execution units in their design to improve processor performance. Multiple, or redundant, execution units are typically present in both multiple issue architectures such as HPPA ('Hewlett-Packard Precision Architecture') or SPARC, and also in VLIW architectures such as EPIC IPF ('Explicitly Parallel Instruction Computer Itanium Processor Family'). Frequently, the execution units are not fully utilized due to serialization with I/O and memory operations. As a result, it is often possible to schedule the execution of redundant checking calculations without significant impact on program execution time. Control over the scheduling of these resources is typically not provided in multiple issue architectures and may not be explicit in the case of some VLIW designs; therefore, resource scheduling is performed by optimizer 205. Optimizer 205 reorders the code and schedules the execution of operations in order to best make use of a processor's available resources, such as functional units, timings and latencies.

In the present temporal replication method, optimizer 205 schedules execution of redundant code segments 210/215 so that a minimum number of clock cycles (i.e., a minimum amount of time) will elapse between the execution of primary copy 210 and secondary copy 215 (hereinafter referred to as primary and secondary 'code segments') of a particular section 207 of compiled source code. The order of execution of the segments is not important as long as the time between the use of the same hardware resource 206 by the primary/secondary pair of code segments 210/215 is greater than some delta, e.g., Dmax. Given that Dmax is known at the time a program is being compiled to run on a certain processor, compiler 202 in the present system 200 ensures that each segment of code 215 that performs the redundant calculations and checking is executed at least Dmax processor cycles apart from the segment of code 210 that performs the initial calculation/checking. Optimizer 205 may insert no-ops ('Nops') or schedule other operations between the two segments of code 210/215 to ensure proper spacing of the execution in time. Alternatively, as described in detail below, one or more temporal diversity timers 208 may be employed to ensure that sufficient time elapses before the first code section is executed.

In an alternative embodiment, a mechanism is provided to incorporate the length of time corresponding to Dmax in a way that can be interrogated by programs running on processor 101. For example, the value of Dmax may be used by these programs (other than compiler 202), to time skew the execution of redundant threads accordingly to allow for an amount of wait time approximately equal to Dmax.

The compiled code shown in Table 1 below is an example showing how the operation A+B=C might be performed on an exemplary VLIW processor, such as processor 101. In the example shown in Table 1, the VLIW processor allows a five operations per cycle in its instruction word; only one branch/compare unit is shown. The instructions shown in each row in Table 1 are issued every clock cycle unless the processor stalls waiting for an operand. In the example below, 'BRUnit' is a branch/compare unit (102A/102B), 'ALU/cmpU' is an integer unit (103A/103B), 'Load/storeU' is a load/store unit (104A/104B), and R1-R3 are registers (106A/106B). The VLIW processor characteristics indicated above are also applicable to all subsequent examples set forth below.

TABLE 1

| Cycle | BRU | ALU/cmpU | Load/storeU | ALU/cmpU | Load/storeU |
|---|---|---|---|---|---|
| (1) | Nop | Nop | Load R1 = A | Nop | Load R2 = B |
| (2) | Nop | Nop | Nop | Nop | Nop |
| (3) | Nop | Nop | Nop | Add R3 = R1 + R2 | Nop |
| (4) | Nop | Nop | Nop | Store R3, C | Nop |

Although the above processor is capable of parallelism, there are still a number of Nops in the compiled code shown above. Compiler 202 may include code to schedule instructions in the available slots and issue pre-fetches, etc., in order to increase performance by scheduling more operations per cycle and by reducing latency.

The compiled and optimized code shown in Table 2 below is an example of the present method of temporal replication for performing the A+B=C operation shown in Table 1. As shown in Table 2, the operation of loading registers R1 and R2 with values of A and B, respectively, is first performed in clock cycle 1, and is repeated at a later time using the same registers in clock cycle 4. The result of the first addition operation is saved in register R3 in cycle 2 and compared by verification code 204, at step 220, against the result of the second addition operation (stored in register R4 in cycle 5). If the values stored in registers R3 and R4 are not equal, a branch to an error handling routine 230 is taken, otherwise, processing continues with the next section of code at step 225. Compiler 202 breaks the program into sections 207 so that checking of the results of the two operations are checked before the results are 'exposed', or used to alter the further flow of execution of the program.

Results may be exposed by writing them to an I/O device, or by writing them to a memory area that might be seen by another process or processor or executing a conditional branch which may or may not alter the flow of control in the program. If error recovery is to be implemented, an additional constraint on a code section 207 is that a segment does not destroy its inputs until checking is successfully completed.

Optimizer 205 may allow code from adjacent computation sections for executing other program statements to overlap the execution and checking code for a segment such as described in Table 2, provided that the temporal redundancy of each statement is individually maintained and ordering is maintained so that results are exposed in program order and only after the checking sequences for each statement have been successfully executed.

Error handling routine 230 may provide for retrying an erroneous operation a predetermined number of times, or, alternatively, may cause a fault or take other action in lieu of retrying the operation.

In the example shown in Table 2, NOPs have been inserted into clock cycle 3 by compiler 202. The number of clock cycles that are placed between the execution of the primary copy 210 and the secondary copy 215 of the section of compiled code is a function of the value of Dmax for a particular processor, as explained above. In the Table 2 example, registers R1-R4 correspond to registers in register file 106A/106B in FIG. 1, and 'Error' is the label of error-handling routine 230. The code shown in Table 2 has been compiled/optimized for a Dmax of 3 cycles; that is, there are three clock cycles between the execution of redundant code segments. For example, the first 'Load R1=A' operation has been compiled to execute during clock cycle (1), and the redundant execution of this same operation has been compiled to execute 3 cycles later, during clock cycle (4).

TABLE 2

| Cycle | BRUnit | ALU/cmpU | Load/storeU | ALU/cmpU | Load/storeU |
|---|---|---|---|---|---|
| (1) | Nop | Nop | Load R1 = A | Nop | Load R2 = B |
| (2) | Nop | Add R3 = R1 + R2 | Nop | Nop | Nop |
| (3) | Nop | Nop | Nop | Nop | Nop |
| (4) | Nop | Nop | Load R1 = A | Nop | Load R2 = B |
| (5) | Nop | Add R4 = R1 + R2 | Nop | Nop | Store R3, C |
| (6) | Nop | Comp R4, R3 | Nop | Nop | Nop |
| (7) | BNE Error | | | | |

Label Error: //Retry and error handling routine

Error Handling

The present system performs one or more checks, as indicated by decision block 220 in FIG. 2 (and by block 320 in FIG. 3), to ensure that the results of computations performed for a code section in two independent computation domains (i.e., temporal or spatial domains) are identical prior to exposing the code to further computation, or before using the result to direct a branch operation. This can be done both before and after the branch is actually taken in order to provide opportunities for optimization by optimizer 205.

In the case that a mismatch is found between the redundant computations the program will branch to error handling code 230. Recovery may be as simple as indicating an error and terminating the execution of the program ('fail fast'). This technique may be adequate if other levels of recovery are provided by the system. Alternatively, the program may be restarted from the beginning, although this procedure may not be acceptable in some kinds of interactive applications.

In a more comprehensive recovery procedure, the last program segment is re-executed. Since no computed values are exposed until all computations are checked, a program stage, or segment, that produces an erroneous result may be safely re-executed from the beginning to recover from an error. In an alternative embodiment, a flag is set, indicating that an error recovery operation is in progress. This flag is cleared if the stage of the computation completes successfully. If a second error is encountered in attempting to execute this stage of the program, an indication will be given that a hard error has been encountered.

A further alternative error handling technique includes structuring a program so that the results are computed three or more times on different domains, wherein the program code is structured so that the computed results delivered by the majority of the computational domains is exposed as the result of execution of a particular segment of the code. Note that any of these methods may be selectively used on only the code needing this level of protection.

Spatial Replication

Figure 3:
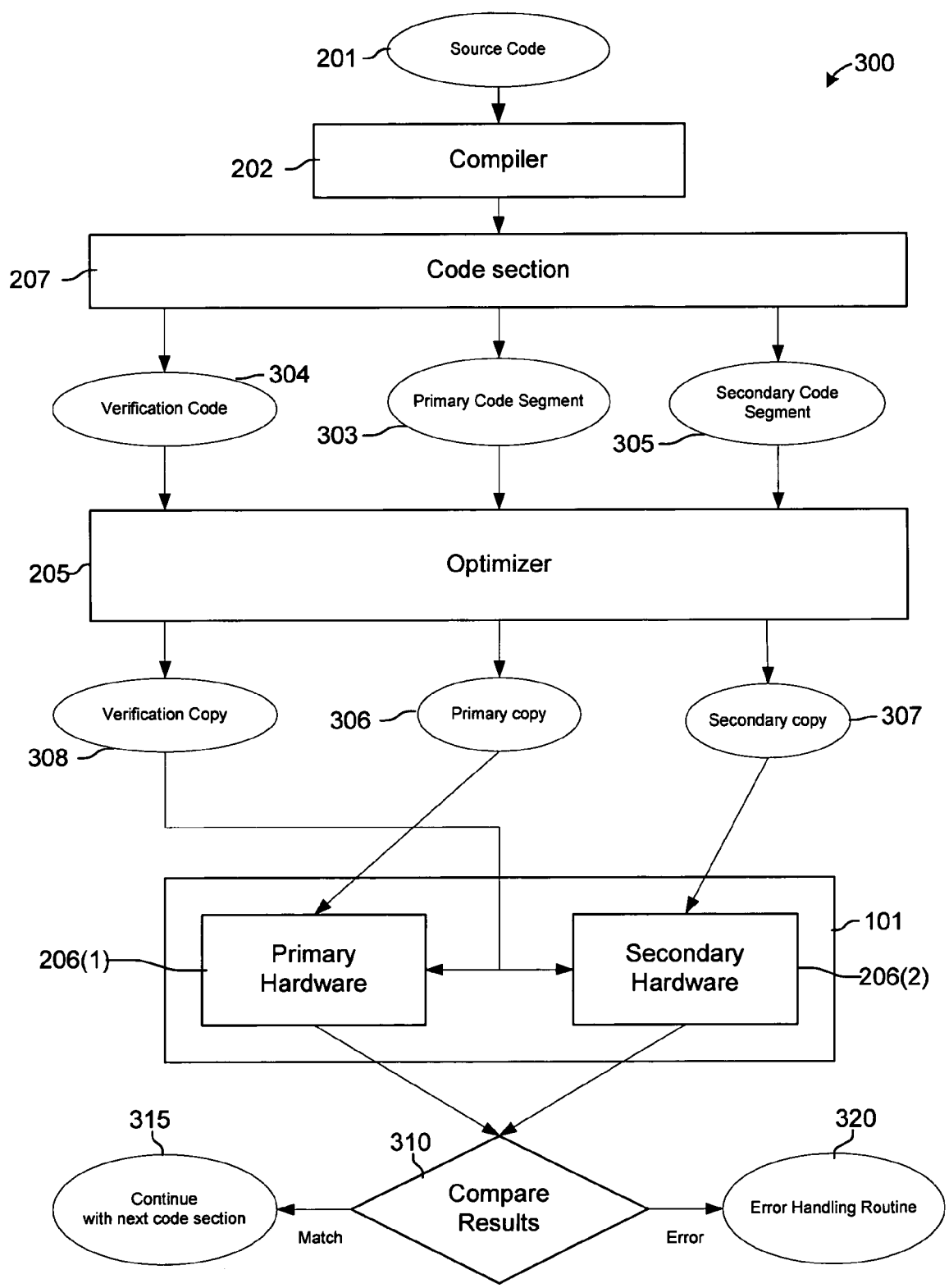
FIG. 3 is a diagram showing exemplary components and process flow for a spatial replication fault detection system.

FIG. 3 is a diagram showing exemplary components and process flow for a spatial replication fault detection system 300. In the spatial replication method, the code for a particular program may be executed two or more times, with each execution path using separate processor resources including functional units and registers.

As shown in FIG. 3, source code 201 for the program of interest is initially separated into computation sections 207 by compiler 202 based on a model wherein each segment takes a set of inputs, performs computations on the input values, and exposes a set of outputs to further computation. Each computation section 207 is then compiled by compiler 202 to generate primary compiled code segment 303, secondary compiled code segment 305, and verification code 304, which are input to optimizer 205.

Optimizer 205 then generates primary and secondary segments (copies) 306 and 307 of code corresponding to code segments 303 and 305, ensuring that the primary and secondary segments are executed using different registers and functional units 206(1)/206(2) (as well as any other execution resources utilized by the program), respectively. An optimized copy 308 of verification code 304 is also generated by optimizer 205. Optimizer 205 may reorder the operations in segments 306/307 as long as it does not eliminate the primary or secondary operation with respect to a segment pair, or cause them to be executed on the same resource or expose a result until the checking code has verified that the results are identical. As in the temporal replication case, the compiler divides code into sections so that checking is performed prior to the exposure of any results or transfers of control.

In an alternative embodiment, 'hints', such as tags, are provided to allow a computation domain to be associated with a set of execution and data resources that is disjoint from the resources used for other computation domains. Execution of different computation domains may be allowed to overlap. Compiler 202 generates a first code segment for the execution of each stage (computation section) of program execution along with a second code segment for redundant computation and checking of the results, specifying a different computation domain for each segment.

For example, if in a stage of the execution of a program one needed to assign s=sin(a), compiler 202 may generate code such as the following:

ts=sin(a); in the first computation domain;
rs=sin(a); in the second computation domain; and
if if(ts< >rs) go to recovery routine;
[at this point s can be exposed for further computation]
s=ts;

Code is then generated for subsequent program stages. In the present embodiment, one computation domain uses a first set of execution units, e.g., functional units 102A-105A and registers in register group 106A, and the other computation domain uses a second set of execution units, e.g., functional units 102B-105B and registers in register group 106B.

'Hints' maybe be given to the processor's execution unit scheduling logic by tagging groups of instructions with information that indicates the computation domain with which each group of instructions is associated. Hints may also be included in the compiled code to assure that the optimizer or hardware does not discard the duplicated operations.

Before the result of a computation is exposed, or used for further computation, checking of the redundant results is performed. Verification code 304 generated by compiler 202 is executed, as indicated by decision block 310, to compare the results of execution of primary and secondary code segments 306/307. This checking may also be performed in a computation domain different from those used in the actual computation. In the case that the results do not match, recovery actions can be attempted that are similar to those described with respect to FIG. 2 in the above section on temporal replication. Compiler 202 can make use of the explicit scheduling available in the instruction set of many VLIW processors to ensure that redundant pairs of code are not executed by the same functional units. If a discrepancy in results is found, appropriate recovery action is taken by error handling routine 320. This recovery action may include re-execution, failing, or trapping to software or operating system handlers.

The compiled code shown in Table 3 below is an example of the present method of spatial replication for performing the A+B=C operation shown in Table 1. As shown in Table 3, registers R1 and R11 are loaded with the value of A in clock cycle 1, and registers R2 and R12 are loaded with the value of B in clock cycle 2. Registers R1 and R2 are, for example, part of register group 106A and registers R11 and R12 are part of register group 106B. During clock cycle 3, registers R3 and R13 are used to sum the contents of registers R1/R2 and R11/R12, respectively.

Register R4 is then loaded with the stored value of 'C', and the result of the first addition operation is then compared by verification of copy 304/308 in clock cycle 4 (step 310 in FIG. 3), against the result of the second addition operation. If the values stored in registers R3 and R13 are not equal, a branch to error handling routine 320 is taken, in cycle 5. During clock cycle 6, the sum stored in register R13 is stored in processor memory as 'C'. If the values stored in registers R3 and R13 match, then the values stored in registers 3 and 4 are compared, in clock cycle 7. Here, the value of an operand stored to memory is reloaded and its fetched value compared to that which was supposed to be stored. This is done to be sure that there was no error on the paths from the register to memory or in the memory controller. If the values stored in registers R3 and R4 are not equal, a branch to error handling routine 320 is taken in cycle 8, otherwise, processing continues with the next section of code, at step 315.

The results of the two operations are checked before the results are 'exposed', or used to alter the further flow of execution of the program. Error handling routine 320 may provide for any combination of the following actions: retrying an erroneous operation a predetermined number of times; causing a fault, or taking other action in lieu of retrying the operation; error reporting; and statistics collection.

Each column of instructions in Table 3 is executed by a specific functional unit in processor 101, as well as by a specific group of registers, in either group 106A or 106B in the register file 107. Register file 107 is partitioned such that the same register resources are not used by the primary and secondary code segments 306/307.

TABLE 3

| Cycle | BRUnit | Primary units | | Secondary Units | |
|---|---|---|---|---|---|
| | | ALU/cmpU | Load/storeU | ALU/cmpU | Load/storeU |
| (1) | Nop | Nop | Load R1 = A | Nop | Load R11 = A |
| (2) | Nop | Nop | Load R2 = B | Nop | Load R12 = B |
| (3) | Nop | Add R3 = R1 + R2 | Nop | Add R13 = R11 + R12 | NoP |
| (4) | Nop | Nop | Nop | Comp R13, R3 | Nop |
| (5) | BNE Error | Nop | Nop | Store R13, C | Nop |
| (6) | Nop | Nop | Load R4 = C | Nop | Nop |
| (7) | Nop | Nop | Comp R4, R3 | Nop | Nop |
| (8) | BNE Error | Nop | Nop | Nop | Nop |

Label Error: // Error and retry handling routine

Note that optimizer 205 may schedule subsequent operations into some of the Nop spots in the code shown above. As shown in the example in Table 3, duplicated code using different result registers allows comparison of results to determine if there was an error in the functional units, registers, or on the paths between them. The same is true of compare operations as well.

In an alternative embodiment, the target address or label of a branch (or other change of control operation) may be loaded into a register so that a determination can be made as to whether the change of control was correctly executed, by comparing the value stored in the register with a literal value of the address associated with the label to which the branch was taken. The value stored and compared need not be the address but a value that is sufficiently unique to the label or entry point such that it is unlikely that an errant branch would take control with an identically encoded label or entry point.

In a further alternative embodiment, parameters in procedure and system calls may be duplicated, including passing a redundant return address or command code. Similarly, duplicated results may be returned. These techniques help ensure that the parameters to, and results from, a called routine are correct.

If the host system does not have adequate error detection and correction for memory and the paths to and from memory, two separate data regions, as represented by primary and secondary code segments 306/307, may also be maintained. Data is fetched from the redundant areas and compared to assure the fidelity of the data.

In an alternative embodiment, rather than comparing the results of two spatially distinct computations and branching to an error handling routine, or re-executing the code, the code for a particular program may be executed in more than two spatial domains and the results voted on to determine which result (i.e., the majority result, or consensus) is to be executed.

Figure 4:
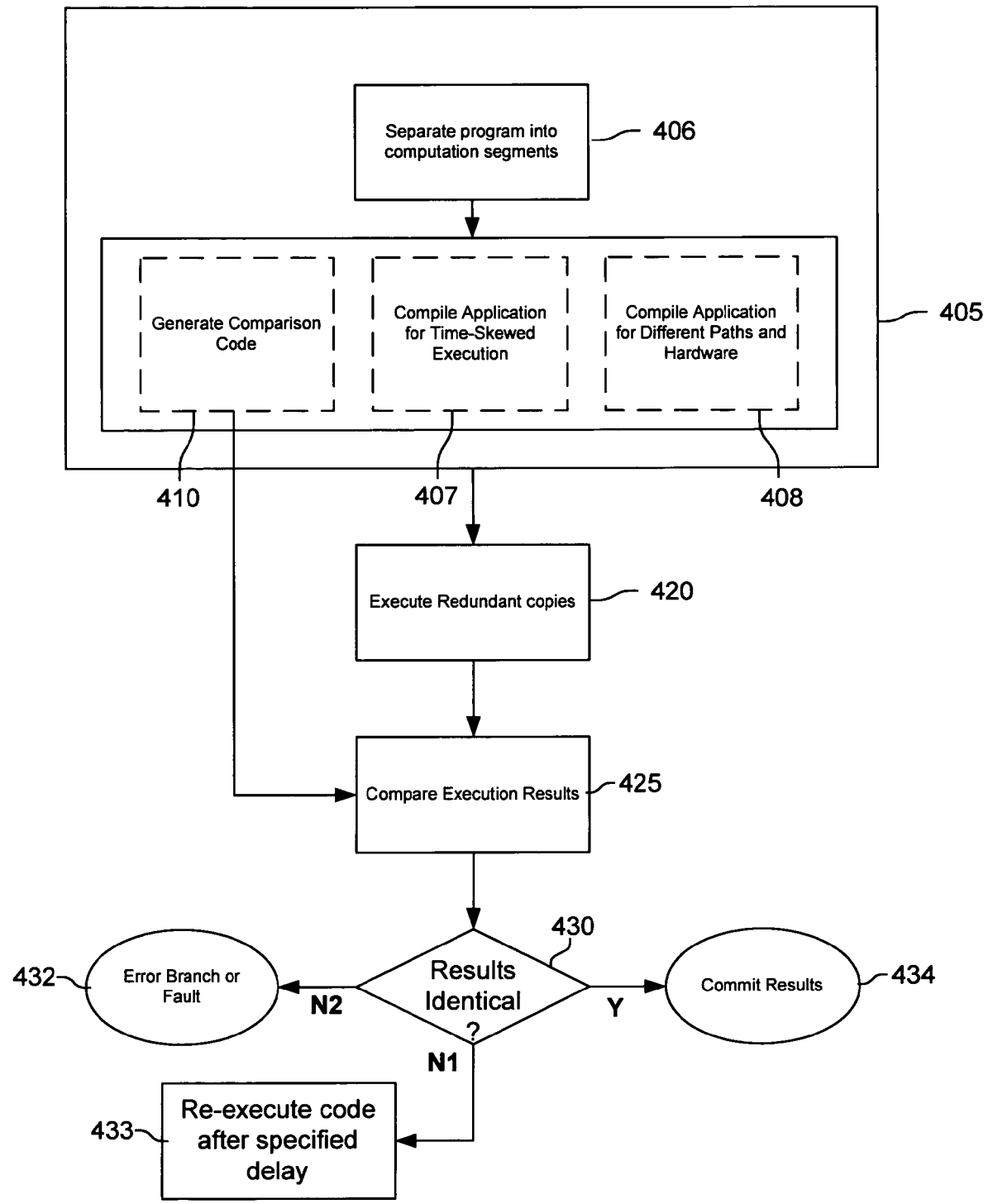
FIG. 4 is a flowchart illustrating exemplary steps performed during operation of the systems shown in FIGS. 2 and 3.

FIG. 4 is a flowchart illustrating exemplary steps performed during operation of the systems shown in FIGS. 2 and 3. As shown in FIG. 4, in step 405, source code for a program is first segmented into computation sections, at step 406, and then compiled and optimized in one of two forms. In either form, the resulting compiled object code will perform a redundant computation in a different computational domain from the domain performing the initial computation.

If the resultant compiled code is to be executed in a time-skewed manner (as described above with respect to FIG. 2), then at step 407, compiler 202 and optimizer 205 generate and schedule execution of two redundant code segments so that a minimum number of clock cycles will elapse between the execution of primary copy 210 and secondary copy 215 of a particular section of the compiled source code.

If the compiled code is to be executed via different hardware entities, then at step 408, compiler 202/optimizer 205 generate essentially redundant primary and secondary copies 306 and 307 of a particular section of code, ensuring that the primary and secondary copies use different registers and functional units 206(1)/206(2). These two copies, or code segments, are said to be essentially redundant because, although the two segments are functionally identical and perform the same computation(s), the two segments are not strictly identical, since different registers and functional units are employed in the execution of each segment. It is to be noted that In either of the above cases (described in steps 407 and 408), compiler 202 may be configured to perform the additional functions of optimizer 205, as described herein.

Verification code is generated by compiler 202 at step 410, during compilation of the corresponding code section. At step 420, the redundant primary and secondary segments (copies) of a compiled code section are executed by processor 101. The verification code generated in step 407 is executed at step 425 to compare the respective results of execution of primary and secondary segments 306/307. At decision block 430, if a discrepancy in results is found, appropriate action is taken by the appropriate error handling routine 230/320. This error recovery action may include re-execution (N1—step 433), or failing or trapping (N2—step 432) to software or operating system handlers. If the respective results of execution of primary and secondary segments 306/307 are identical, then at step 434 the results are committed, and redundant copies of the next section of code are executed, at step 420.

In an alternative embodiment, the verification code itself generated by the compiler may be constructed so that verification is executed redundantly in multiple computation domains.

The above-described operations can be implemented in a standard compiler, or in a tool that dynamically translates code to native machine code or object format such as is done in 'just in time' (JIT) compilers. In another implementation or tool, software that performs static or dynamic code reorganization or optimization may be employed to dynamically translate legacy code into a redundant form, or incrementally translate existing code, in accordance with the present method. A design compliant with the present system may use all or some of the techniques above as determined by the amount of protection that is desired, as well as the performance requirements of the code, and as appropriate to augment whatever error detection mechanisms are built into the relevant hardware.

Variable Delay Instruction

In an alternative embodiment, the processor instruction set includes a compiler-implemented variable delay instruction whose effective delay value is based on the characterized value of Dmax. This embodiment provides a compiler-implemented pair of instructions or instruction predicates, the first of which (a 'start timer' instruction) designates a starting point in time at which a wait interval is initiated, and the second of which (a 'check timer', or 'wait' instruction) delays the execution of subsequent instructions until a time duration of at least Dmax has elapsed between the starting point designation ('start timer') instruction and a conditional wait ('check timer') instruction. If a period of time equal to Dmax has already elapsed, the flow of execution immediately proceeds to the next instruction.

The start timer and check timer instructions may be used together in order to provide a mechanism for ensuring sufficient time to satisfy the conditions for temporal diversity as previously described herein. This mechanism ensures that any effects caused by a soft error will have ended prior to attempting the secondary computation and result comparison/verification. In a simple optimization, a single combined 'check-and-start' instruction or predicate determines whether Dmax time has elapsed since the last combined check and start instruction, and suspends further execution until this condition has been satisfied. A new point in time is then delimited for subsequent combined wait instructions. This combined instruction, instruction pair, or predicate pair allows the characterization of the value of Dmax for a processor or system to be separated from the compiled code in an efficient manner.

Some operations may be omitted from result verification due to their likelihood of generating false alarms, such as reading an interval timer 208. Since primary and secondary code segments are executed at different times, execution of the segments may legitimately produce different results. In addition, there is code that operates on real time data that might change due to the actions of an exogenous event. Instructions used to read this type of real-time data are also not good candidates for redundant execution. However, these instructions typically account for a very small amount (a fractional percentage) of the code executed and their omission has minimal impact on the fault detection effectiveness of the methods disclosed herein.

Figure 5:
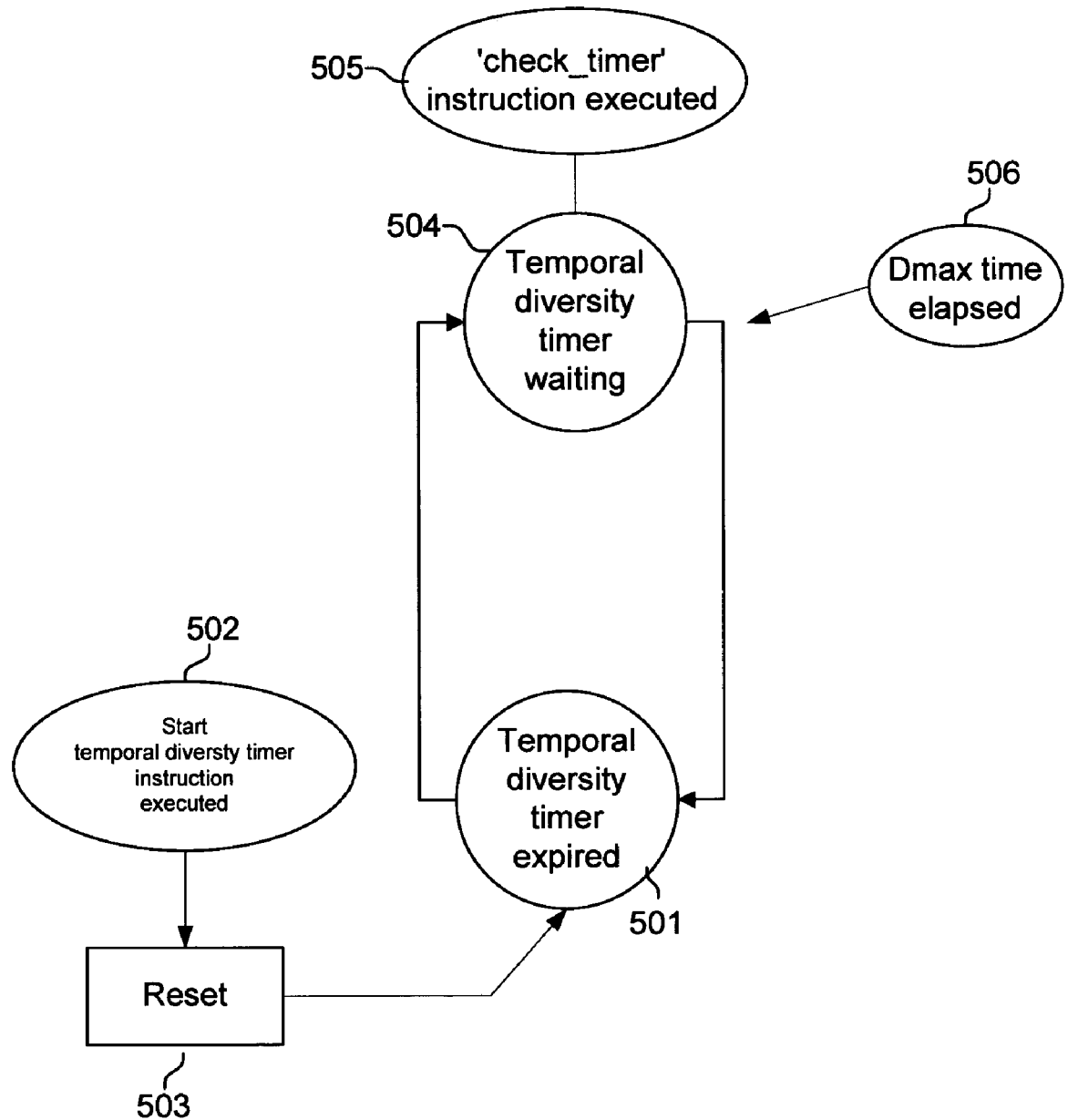
FIG. 5 shows a state diagram for an exemplary software-implemented temporal diversity timer.

FIG. 5 shows the state diagram for an exemplary software-implemented temporal diversity timer 208. As shown in FIG. 5, in block 501, the temporal diversity timer is set to an expired state at system initialization. When a 'start timer' instruction is executed, at step 502, a timer reset instruction is executed, at step 503, and timer 208 transitions to the waiting state shown in block 504 for at least Dmax units of time, at which point (step 506) the timer enters the expired state, at block 501.

While temporal diversity timer 208 is in the waiting state, a 'check timer' instruction may be executed, at step 505, to determine whether the timer has expired. The 'check timer' instruction allows the execution of a code segment to continue upon timer expiration.

Figure 6:
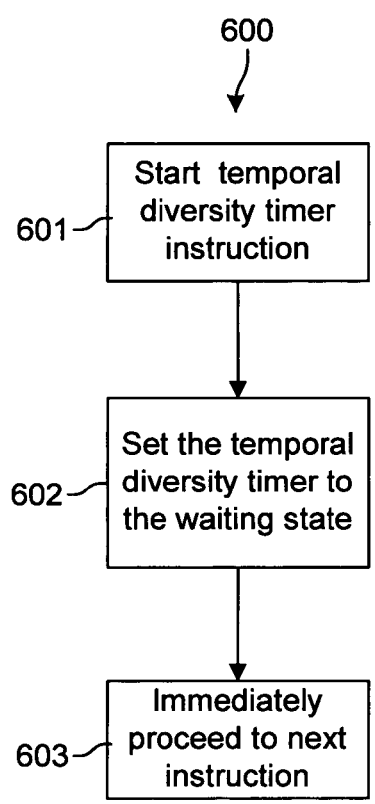
FIG. 6 is a diagram showing operation of an exemplary 'start timer' instruction.

FIG. 6 is a diagram showing operation of an exemplary 'start timer' instruction 600, the execution of which, at step 601, triggers the temporal diversity timer 208 to enter the waiting state for Dmax units of time, at step 602. Execution proceeds to the next instruction in sequence without waiting for the timer, at step 603.

Figure 7:
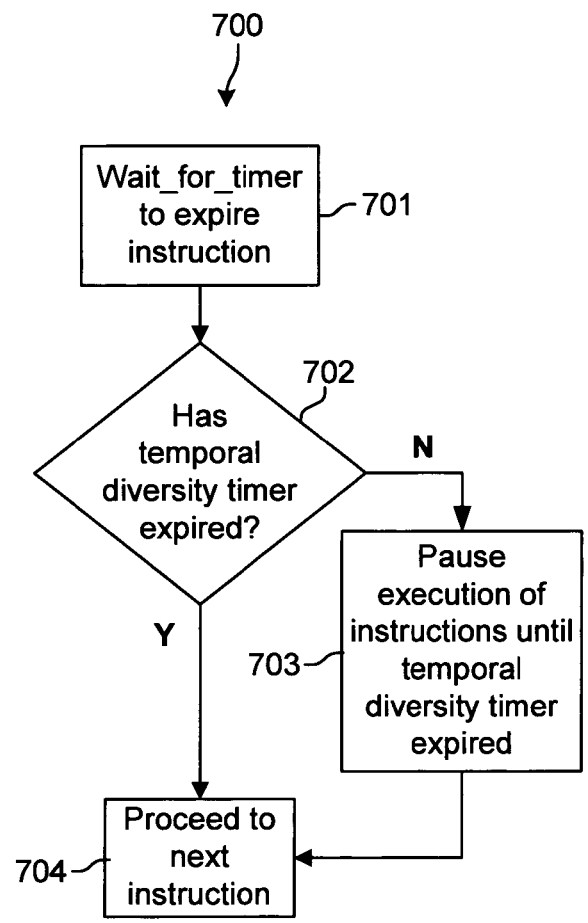
FIG. 7 is a diagram showing operation of an exemplary 'check timer' instruction.

FIG. 7 is a diagram showing operation of an exemplary 'check timer' instruction 700, which, when executed at step 701, causes suspension of the execution of subsequent instructions until the temporal diversity timer has expired. At step 702, if the temporal diversity timer 208 is already in the expired state, code segment execution immediately proceeds to the next instruction, at step 704; otherwise, execution of instructions is paused at step 703 until temporal diversity timer 208 has expired.

A further refinement allows the 'start timer' and 'check timer' instructions 600/700 to specify a unique tag corresponding to each computational domain allowing calculations from unrelated computational domains to be overlapped.

Figure 8:
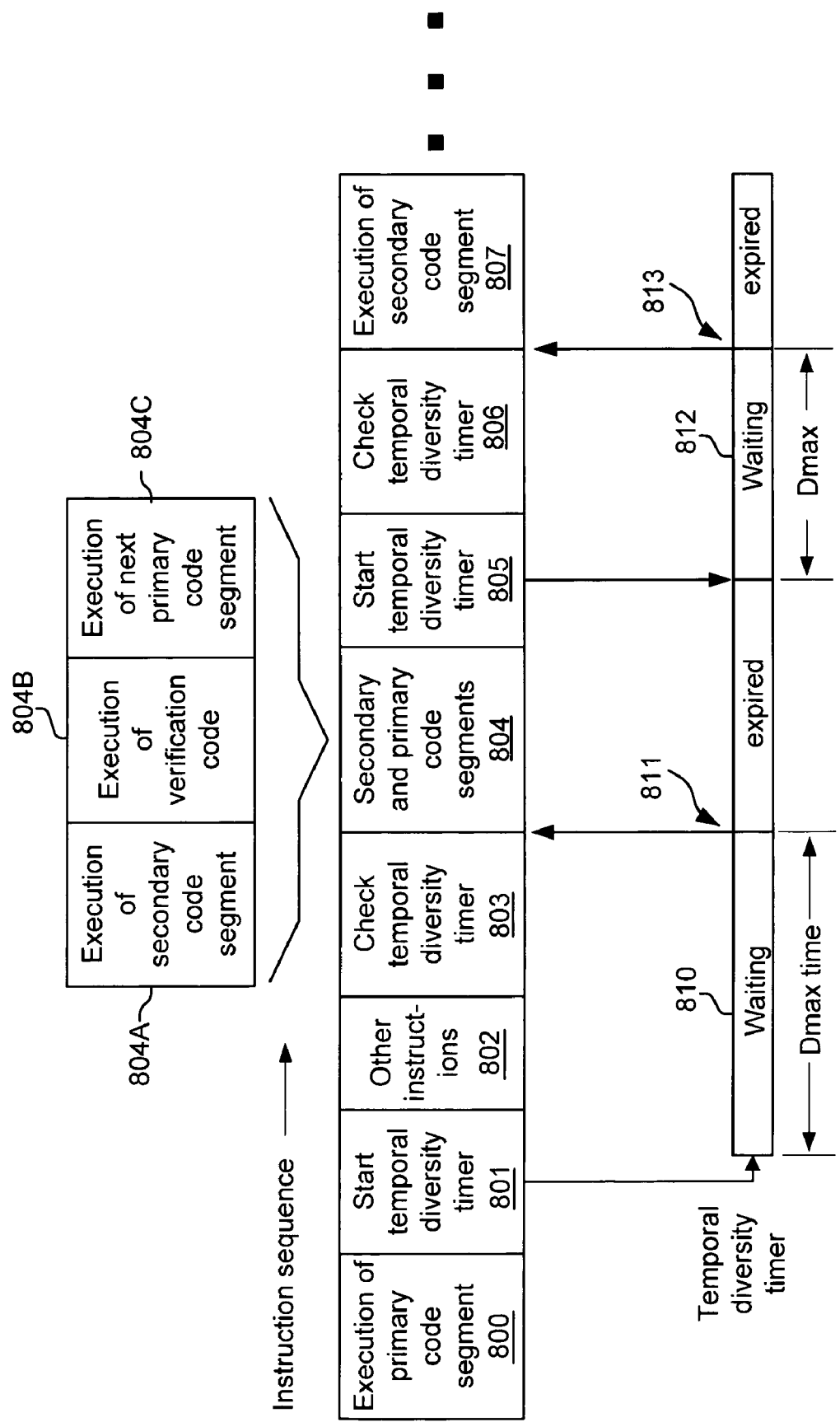
FIG. 8 is a diagram showing exemplary use of the 'start timer' and 'check timer' instructions relative to other instructions and timer states.

FIG. 8 is a diagram showing exemplary use of the 'start timer' and 'check timer' instructions relative to other instructions and timer states. As previously indicated with respect to FIG. 2, the source code 201 for a program of interest is initially separated into a plurality of computation sections 207, preferably by compiler 202, based on a model wherein each section takes a set of inputs, performs computations on the input values, and exposes a set of outputs to further computation. In some instances, the entire program of interest may constitute a computation section 207, thus effectively rendering the remainder of the plurality of computation sections null entities. A primary copy 210 and secondary copy 215 (hereinafter referred to as primary and secondary code segments, respectively) of a particular section 207 of compiled source code is processed by compiler 202 and the resultant generated code is optionally passed to an optimizer 205, which schedules the execution of operations in order to best make use of a particular processor's available resources. The examples presented further below with respect to FIGS. 9-12 also use these primary and secondary code segments 210/215, executing on the same processor, to implement the respective methods shown in the Figures.

As shown in FIG. 8, execution of a primary code segment 210 is initiated in block 800. After execution of the primary segment is completed, temporal diversity timer 208 is triggered by execution of a 'start timer' instruction, in block 801, thereby initiating a waiting period 810 equal to the value of Dmax. The execution of subsequent instructions in the secondary code segment 215 is delayed until Dmax time has elapsed from the time when the 'start timer' instruction was executed. It should be noted that the secondary code segment is not required to wait for execution of the entire primary segment to complete, as long as corresponding instructions in the two segments are separated by a time period at least equal to Dmax. This method of 'overlapping' execution of code segments 210/215 is described below with respect to FIG. 9.

Because of typical system caching effects, there is a tendency for the second, or secondary, code segment 215 to run faster than the first (primary) code segment 210. The first code segment to run will receive a higher rate of cache and TLB (translation lookaside buffer) misses and thus execute more slowly. The second code segment executed will benefit from the first code segment having 'prefetched' its data and will not experience as much of a delay due to storage hierarchies. The mechanisms described herein help maintain a safe interval between the execution of primary and secondary code segments.

In an exemplary embodiment, the value of Dmax may be set to an optimum level, where there is sufficient likelihood that redundant code segments will not be affected by the same transient fault. In actuality, some transient events persist longer than others, and execution of one of the segments may not use a faulted functional unit until the effect of the fault has almost dissipated. The value of Dmax for a particular CPU architecture may be tuned not only for the hardware properties of the CPU, but may also be adjusted in consideration of the specific 'temporal separation' (timer placement) strategy that is required to achieve a practical fault tolerant solution with a soft error detection rate of somewhat less than 100 percent, but which provides relatively fast execution. The relative temporal spacing of timers 208 in this embodiment may be tailored to allow a percentage of undetected transient (soft) errors that is acceptable for a particular application.

The value set for Dmax may take into consideration the expected changes in environment radiation flux, system altitude and shielding, and may be changed dynamically in accordance with locally measured changes in these, and other, factors.

It is to be noted that the primary and secondary code segments 210/215 may be of arbitrary size, for example, as small as a single instruction, or as large as desired. In an alternative embodiment, the timer reset and blocking (waiting for timer expiration) functions are combined and included into each of the instructions executed by a particular processor. This technique thus effectively uses one timer per instruction (primary and secondary code segment) pair.

During waiting period 810, other instructions (not part of the code segments of interest) may optionally be executed, as indicated in block 802, and temporal diversity timer 208 is checked, using a 'check timer' instruction, to determine whether the waiting period has expired, as indicated in block 803.

At the point in time indicated by arrow 811, a period of time equal to Dmax has elapsed since the temporal diversity timer was started, and the timer thus expires. Execution of the secondary code segment 215 (sub-block 804A) corresponding to the primary segment initiated in block 800, and execution of the verification code (sub-block 804B) and the next primary code segment (sub-block 804C) may then take place, as indicated in the expansion of block 804. Prior to the execution of the next primary code segment, temporal diversity timer 208 is again started by execution of a 'start timer' instruction, in block 805, thus initiating waiting period 812, which is again equal to the value of Dmax. During waiting period 812, temporal diversity timer 208 is checked via a 'check timer' instruction, to determine whether the waiting period has expired, as indicated in block 806. Note that instructions that are not part of the present code segment of interest may be executed during waiting period 812.

At the point in time indicated by arrow 813, Dmax time has elapsed since temporal diversity timer 208 was last started, and the timer expires. When a 'check timer' instruction detects that timer 208 has expired, execution of the next secondary code segment is initiated in block 807.

Multi-Threaded Code Segment Execution

In an alternative embodiment, the primary and secondary code segments are executed in separate CPU or O/S (operating system) threads. These threads share the same address space and temporal diversity timer(s) 208. In the present embodiment, the primary code segment 210 executes on one thread and the secondary segment and verification code run on another thread. This method, described below with respect to FIG. 9, allows a thread to use separate register sets to do calculations but only the verification code could commit a change to memory. In an alternative embodiment, the verification code may be executed on a third thread.

Figure 9:
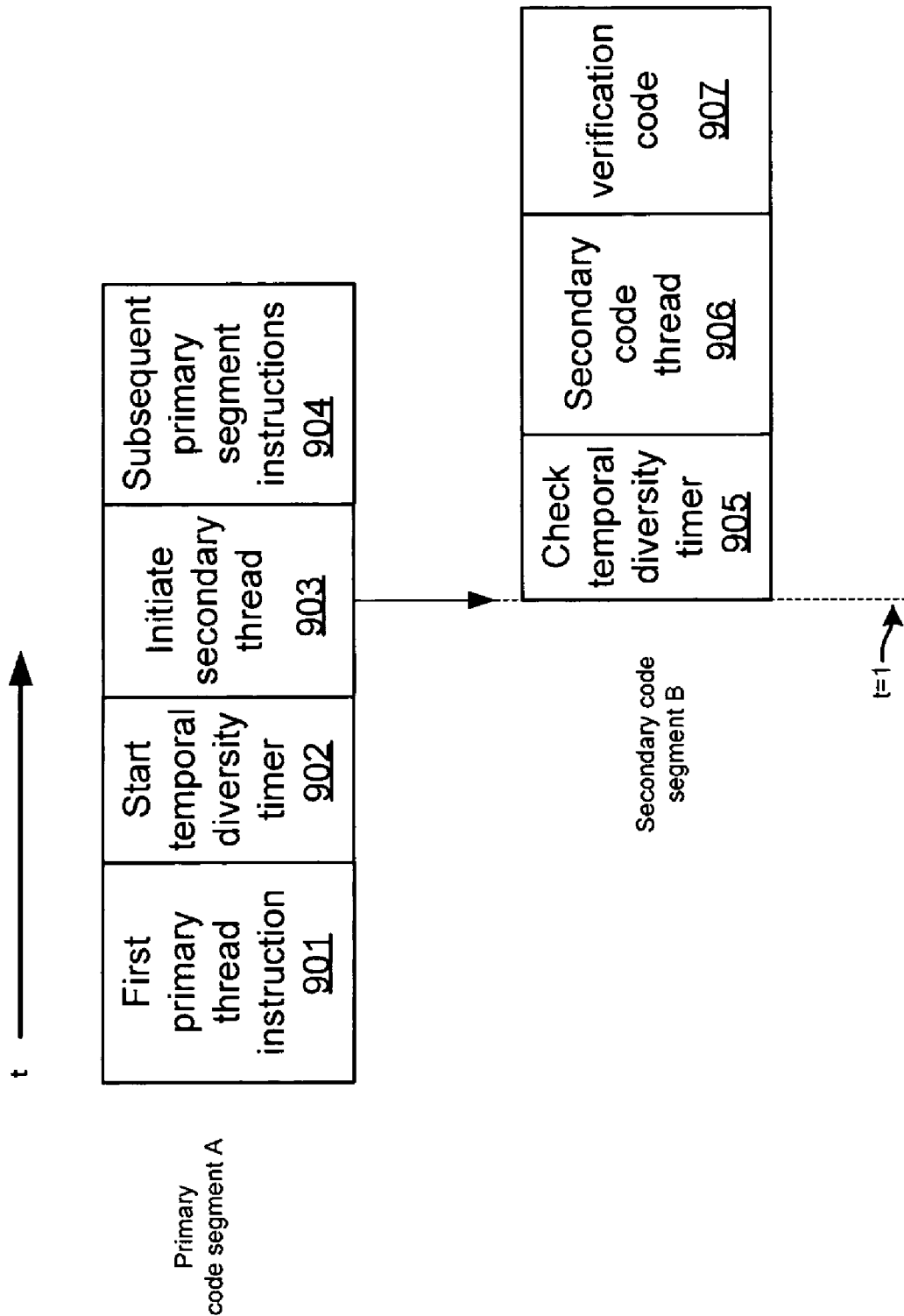
FIG. 9 is an exemplary diagram showing the use of two code segments for the same code section, where the processor set allows overlap in the execution of instructions.

FIG. 9 is an exemplary diagram showing the use of two code segments, or threads, for the same code section, where the processor set in use allows some overlap in the execution of instructions, e.g., via hardware multi-threading, or simply where use of a multi-threaded O/S allows overlap in the execution of two code segments. In the embodiment of FIG.

9, initiation of execution of the secondary code thread does not necessarily wait for execution of the entire primary code thread to complete. The method shown in FIG. 9 assumes that the execution of the secondary code thread does not normally catch up with execution of the primary code thread.

In the embodiment shown in FIG. 9, a temporal diversity timer 208 is started immediately after execution of the first instruction in the primary code thread, and the timer is checked immediately after the timer is started, and execution of code in the secondary code thread is delayed until expiration of the timer occurs. The method shown in FIG. 9 is actually a somewhat hybrid temporal/spatial scheme, since the secondary code is not necessarily being executed on the exact same hardware devices as the primary code.

As shown in FIG. 9, execution of the first instruction in a primary code segment or thread 210 is initiated in thread A, in block 901, followed by execution of a 'start timer' instruction in block 902, thereby starting temporal diversity timer 208 and initiating a waiting period equal to the value of Dmax, for the remaining code in the primary thread.

Immediately after the timer is started, a second thread, thread B, is initiated, in block 903 (shown at time t=1). Temporal diversity timer 208 is then checked in thread B, in block 905, and initiation of execution of the secondary code is delayed until the timer times out. In the present embodiment, the secondary code thread is not required to wait for execution of the entire primary thread to complete. As long as corresponding instructions in the primary and secondary threads are separated by a time period at least equal to Dmax, the secondary code thread may be executed as soon as the temporal diversity timer expires.

In thread A, in block 904, the remaining instructions in primary thread are executed quasi-simultaneously with the execution of the secondary code thread in block 906, which is initiated when timer 208 has timed out. In thread B, verification code is executed in block 907, under the assumption that execution of the primary code thread has completed prior to the time that the secondary code thread has finished executing. Thread B may optionally determine whether the primary code thread has completed execution by checking a thread completion flag set by thread A.

Multiple Timer Use

Figure 10:
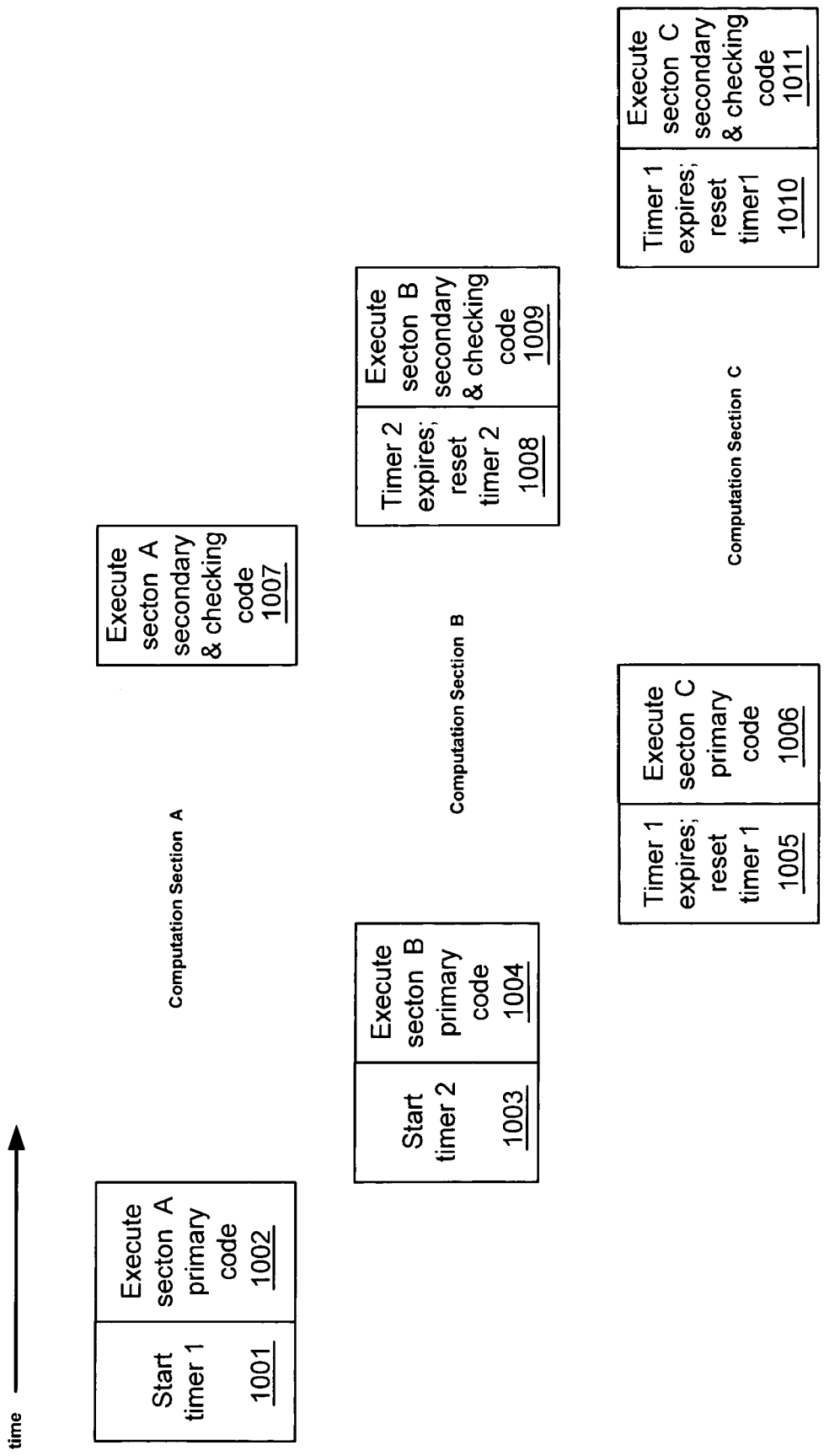
FIG. 10 is a diagram showing an exemplary set of steps, wherein multiple temporal diversity timers are employed to allow overlapped execution of program segments.
Figure 11:
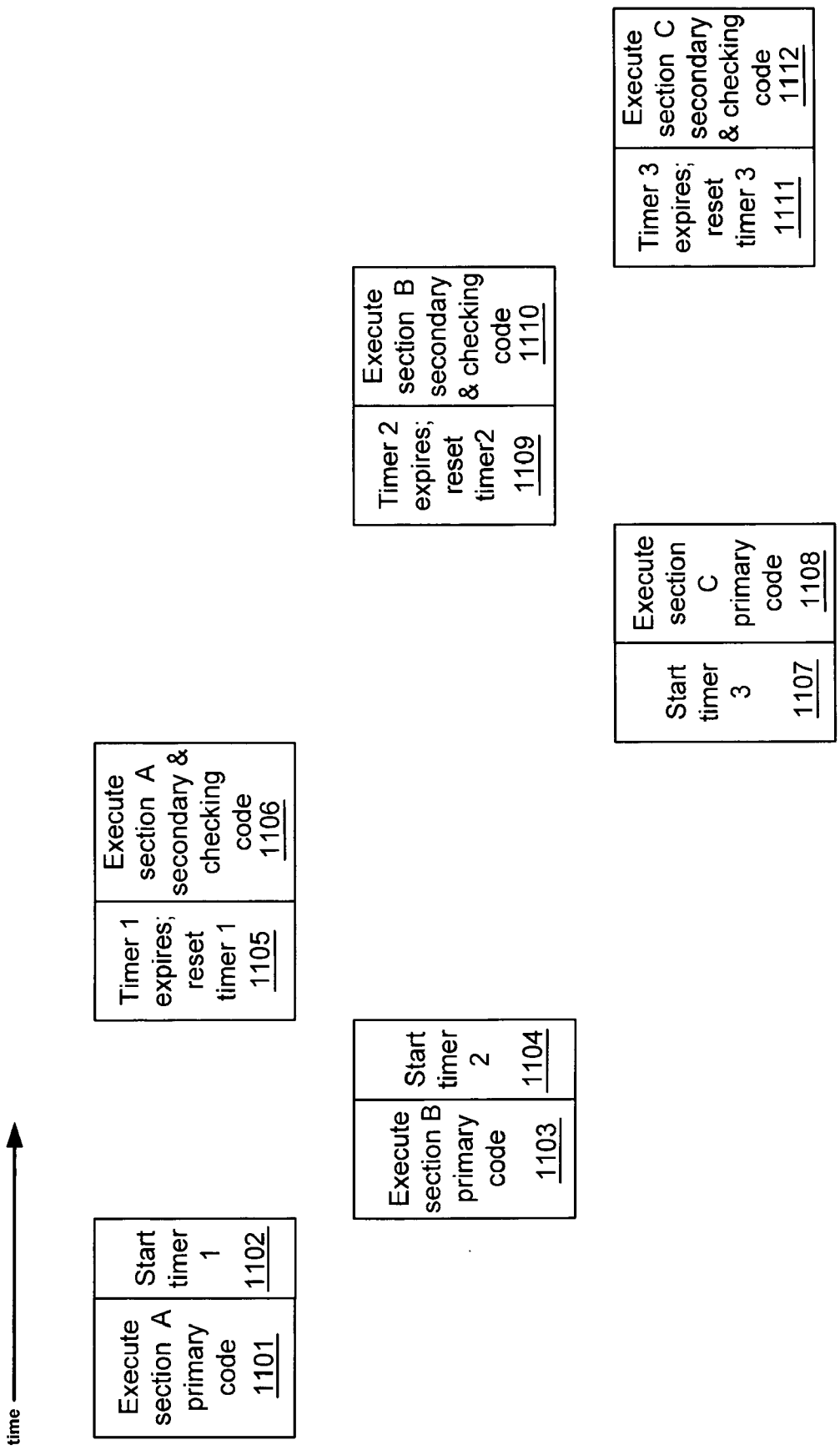
FIG. 11 is a diagram showing an exemplary set of steps wherein temporal diversity timers are placed between the execution of primary and secondary code segments.
Figure 12:
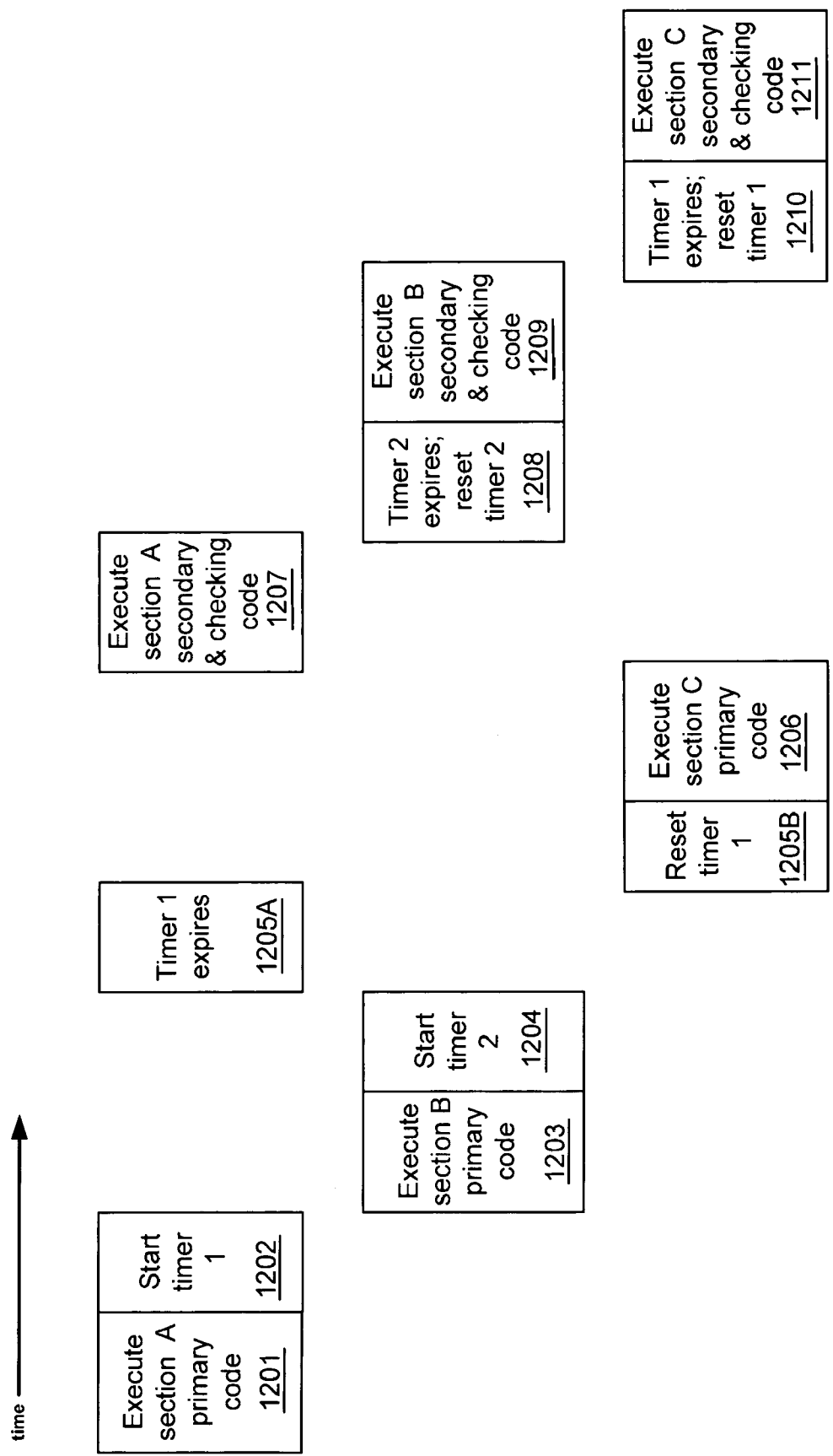
FIG. 12 is a diagram showing an exemplary set of steps wherein temporal diversity timers, placed between primary and secondary code segments, are reused.

FIGS. 10-12 are diagrams showing execution of multiple program segments in an exemplary embodiment wherein multiple named timers 208 are employed, to allow overlapped execution of the program segments 210/215. No overlap in the execution of instructions of two different code segments is shown in FIGS. 10-12, but it should be noted that certain processor sets may allow concurrent execution of more than one segment of program code, where, for example, multi-processing or multi-threading is employed. In the methods shown in FIGS. 10-12, multiple named timers (e.g., each using a tag to specify the corresponding computational domain) 208 are provided, which can be independently started and waited for. For example, separate instructions for starting and waiting for a named timer are implemented, such as the following instruction pair:

starttimer<timer_name>
waitfortimer<time_name>

Alternatively, a combined instruction is provided which performs both of the above functions, such as, for example:

waitforandstart<waitfortimername>, <starttimername>

Providing multiple timers permits different program segments to overlap while allowing temporal diversity to be maintained for each code segment, thus allowing more efficient instruction execution. The number of timers provided is a function of the number of potentially overlapping temporal domains or computational program sections. In each case, the use of a timer 208 and a corresponding 'check timer' instruction ensures that sufficient time has elapsed since the designated timer was started to maintain temporal diversity requirements.

In the present embodiment, the actual number of clock cycles consumed by the delay instruction is made programmable or adjustable by firmware or by the operating system. This allows the characterization of the processor's Dmax value to be separated from the design of the processor. This also allows such characterization to overlap or follow the design, development and manufacturing of the processor to accommodate variations in the manufacturing processes and also refinement of the characterization of Dmax based on long term observation of processor populations. The value of Dmax may be computed as a function of physical parameters corresponding to the particular processor or system, or computed based a function of the physical environment, for example, altitude or measured background radiation.

In addition, each of the above-described instruction types in the present embodiment may be made modal so that a delay is imposed only if the full operation of the temporal diversity technique described herein Is required.

FIG. 10 is a diagram showing an exemplary set of steps, wherein multiple temporal diversity timers 208 are employed to allow overlapped execution of the program segments 210/215. In the embodiment shown in FIG. 10, a temporal diversity timer 208 is started before each segment 210 of primary code is executed. The use of more than one timer allows better temporal separation between execution of the primary and secondary code segments, as shown in FIG. 10, in which three separate computation sections 207 of program code are executed while maintaining temporal diversity between the execution of the primary code segment 210 for a particular computation section 207 and the execution of the secondary (redundant) code segment 215 for the same section 207. Each timer 208 may be implemented via a register or other method well-known in the art. In an alternative embodiment, the system hardware may set a timer automatically for each instruction that is executed, i.e., timers 208 are, in effect, integrated into each instruction. Two timers 208, timer 1 and timer 2, are used in the FIG. 10 example, which shows re-use of the first timer (timer 1).

As shown in FIG. 10, in block 1001, timer 1 is started, by executing a named 'start timer' instruction (e.g., 'starttimer timer1'), thereby starting a temporal diversity timer 208 and initiating a waiting period equal to the value of Dmax, for the code in computation section A. The primary code segment for computation section A is then executed during block 1002. After of completion of execution of the primary code segment for computation section A, second named timer, timer 2, is then started in block 1003, and the primary code segment for code computation section B is executed during block 1004. In block 1005, timer 1 is checked, using a 'check timer' instruction (e.g., 'waitfortimer timer1'), and when the timer expires, it is reset (restarted). Timer 1 will now be re-used for computation section C.

In block 1006, execution of computation section C is initiated. Since timer 1 has expired for the section A primary code segment, then in block 1007, the section A secondary code for segment is executed, after which the verification or checking code for computation section A is executed to determine whether a soft error occurred during execution of the primary code segment for that section.

In block 1008, timer 2 is checked, and when the timer expires, it is reset, after which the primary code segment for computation section B is executed during block 1009. After timer 1 expires, in block 1010, the secondary code segment for computation section C is executed, followed by execution of the verification code for the segment, in block 1011. Table 4, below, shows the instruction sequence corresponding to the process described above with respect to FIG. 10.

TABLE 4

| Instr. Seq. | Primary Seg. | Sec. Seg. | Timer | |
|---|---|---|---|---|
| 1 | | | 1 | Set timer 1 |
| 2 | sec. A | | | Execute sec. A primary code |
| 3 | | | 2 | Set timer 2 |
| 4 | sec. B | | | Execute sec. B primary code |
| 5 | | | 1 | Wait for timer 1 to expire; reset timer 1 |
| 6 | sec. C | | | Execute sec. C primary code; now timer 1 used for sec. C |
| 7 | | sec. A | | Now safe to execute sec. A secondary and checking code |
| 8 | | | 2 | Wait for timer 2 to expire; reset timer 2 |
| 9 | | sec. B | | Now safe to execute sec. B secondary and checking code |
| 10 | | | 1 | Wait for timer 1 to expire; reset timer 1 |
| 11 | | sec. C | | Now safe to execute sec. C secondary and checking code |

FIG. 11 is a diagram showing an exemplary set of steps wherein temporal diversity timers 208 are placed between the execution of primary and secondary code segments for better temporal separation between the primary and secondary execution streams. As shown in FIG. 11, in block 1101, the primary code segment for computation section A is executed. Timer 1 is then started, in block 1102. Next, in block 1103, the primary code segment for computation section B is executed, after which, timer 2 is started, in block 1104.

In block 1105, timer 1 is checked, using a 'check timer' instruction, and when the timer expires, it is restarted. The secondary code segment for computation section A is then executed, followed by execution of the verification code for the section, in block 1106. Timer 3 is then restarted, in block 1107, and the primary code segment for computation section C is executed, in block 1108.

In block 1109, timer 2 is checked, and when the timer expires it is restarted. The secondary code segment for computation section B is then executed, followed by execution of the verification code for the section, in block 1110. Timer 3 is then checked, in block 1111, and when the timer expires it is restarted. The secondary code segment for computation section C is then executed, followed by execution of the verification code for the section, in block 1112. Table 5, below, shows the instruction sequence corresponding to the process described above with respect to FIG. 11.

TABLE 5

| Instr. Seq. | Primary Instr. | Sec. Instr. | Timer | |
|---|---|---|---|---|
| 1 | sec. A | | | Execute sec. A primary code |
| 2 | | | 1 | Set timer 1 |
| 3 | sec. B | | | Execute sec. B primary code |
| 4 | | | 2 | Set timer 2 |
| 5 | | | 1 | Wait for timer 1 to expire; reset timer 1 |
| 6 | | sec. A | | Now safe to execute sec. A secondary and checking code |
| 7 | | | 3 | Set timer 3 |

TABLE 5-continued

| Instr. Seq. | Primary Instr. | Sec. Instr. | Timer | |
|---|---|---|---|---|
| 8 | sec. C | | | Execute sec. C primary code; now timer 1 used for sec. C |
| 9 | | | 2 | Wait for timer 2 to expire; reset timer 2 |
| 10 | | sec. B | | Now safe to execute sec. B secondary and checking code |
| 11 | | | 3 | Wait for timer 3 to expire; reset timer 3 |
| 12 | | sec. C | | Now safe to execute sec. C secondary and checking code |

FIG. 12 is a diagram showing an exemplary set of steps wherein temporal diversity timers 208, placed between primary and secondary code segments, are reused. As shown in FIG. 12, in block 1201, the primary code segment for computation section A is executed. Temporal diversity timer 1 is then started, in block 1202. Next, in block 1203, the primary code segment for computation section A is executed, after which, temporal diversity timer 2 is started, in block 1204.

In block 1205A, timer 1 is checked, using a 'check timer' instruction, and when the timer expires, it is restarted at block 1205B. In contrast to the method described with respect to FIG. 11, timer 1 is now reused for another computation section, namely section C, in the present example. After execution of the primary code segment for computation section C, in block 1206, the secondary code segment for computation section A is executed, followed by execution of the verification code for the section, in block 1207. Note that the method shown in FIG. 12 imposes a greater delay between initial execution of the primary code segments and the execution/verification of the corresponding secondary code segments than the method of FIG. 11.

In block 1208, timer 2 is checked, and when the timer expires it is restarted. The secondary code segment for computation section B is then executed, followed by execution of the verification code for the section, in block 1209. Timer 1 is then checked, in block 1210, and when the timer expires it is restarted. The secondary code segment for computation section C is then executed, followed by execution of the verification code for the section, in block 1211. Table 6, below, shows the instruction sequence corresponding to the process described above with respect to FIG. 12.

TABLE 6

| Instr. Seq. | Primary Instr. | Sec. Instr. | Timer | |
|---|---|---|---|---|
| 1 | sec. A | | | Execute sec. A primary code |
| 2 | | | 1 | Set timer 1 |
| 3 | sec. B | | | Execute sec. B primary code |
| 4 | | | 2 | Set timer 2 |
| 5 | | | 1 | Wait for timer 1 to expire; reset timer 1 |
| 6 | sec. C | | | Execute sec. C primary code; now timer 1 used for sec. C |
| 7 | | sec. A | | Now safe to execute sec. A secondary and checking code |
| 8 | | | 2 | Wait for timer 2 to expire; reset timer 2 |
| 9 | | sec. B | | Now safe to execute sec. B secondary and checking code |
| 10 | | | 1 | Wait for timer 1 to expire; reset timer 1 |
| 11 | | sec. C | | Now safe to execute sec. C secondary and checking code |

Certain changes may be made in the above methods and systems without departing from the scope of the present system. It is to be noted that all matter contained in the above description or shown in the accompanying drawings is to be interpreted as illustrative and not in a limiting sense. For example, the processor shown in FIG. 1 may be constructed to include components other than those shown therein, and the components may be arranged in other configurations. The elements and steps shown in FIGS. 2-12 may also be modified in accordance with the methods described herein, and the steps shown therein may be sequenced in other configurations without departing from the spirit of the system thus described.

What is claimed is:

1. A method for detecting computational errors in a digital processor executing a program on a computer system, the method comprising steps of:

dividing the program into a plurality of computation sections;

generating two functionally identical code segments respectively comprising a primary segment and a secondary segment, for each of the computation sections;

executing a first and second computation section by the use of timers to allow overlapped execution of the code segments on the same processor wherein, the execution of the first computation section is performed by the steps of:

1) initiating execution of the primary segment in the first computation section;

2) starting a first temporal diversity timer after the execution of the primary segment in the first computation section;

3) initiating execution of the secondary segment in the first computation section upon expiration of the first timer;

4) upon termination of the secondary segment of the first computation section, initiating execution of checking code to compare respective results of execution of the primary and the secondary segments of the first computation section; and 5) providing an error indication if the respective results of the primary and secondary segments of the first computation section are not identical;

wherein execution of the second computation section is performed by the steps of:

1) upon starting of the first temporal diversity timer, initiating execution of the primary segment in the second computation section;

2) starting a second temporal diversity timer after the execution of the primary segment in the second computation section;

3) initiating execution of the secondary segment in the second computation section upon expiration of the second timer;

4) upon termination of the secondary segment of the second computation section, initiating execution of checking code to compare respective results of execution of the primary and the secondary segments of the second computation section; and 5) providing an error indication if the respective results of the primary and secondary segments of the second computation section are not identical;

wherein the first and second timers are equal to the average duration of certain events.

2. The method of claim 1, including the steps of:

generating comparison code for comparing respective results produced by execution of the primary segment and the secondary segments; and comparing the respective results using the comparison code.

3. The method of claim 1, wherein each of the computation sections takes a set of inputs, performs computations on the inputs, and exposes a set of outputs to further computation.

4. The method of claim 1, wherein the two functionally identical code segments are generated by a compiler.

5. The method of claim 1, wherein the temporal diversity timer is implemented via software.

6. The method of claim 1, wherein the expiration of the second temporal diversity timer indicates the lapse of a period equal to Dmax, which is a predetermined value approximately equal to the average duration of certain external events potentially disruptive to execution of the program.

7. The method of claim 6, wherein said certain external events include disturbances caused by alpha particles.

8. The method of claim 6, wherein said certain external events include disturbances caused by cosmic rays.

9. A method for detecting computational errors in a digital processor executing a program on a computer system, the method comprising steps of:

dividing the program into a plurality of computation sections;

generating two functionally identical code segments respectively comprising a primary segment and a secondary segment, for each of the computation sections, wherein a first one of the segments executes in a primary thread and a second one of the segments executes in a secondary thread;

executing a first and second computation section by the use of timers to allow overlapped execution of the code segments on the same processor wherein, the execution of the first computation section is performed by the steps of:

1) initiating execution of the primary segment in the first computation section;

2) starting a first temporal diversity timer after the execution of the primary segment in the first computation section;

3) initiating execution of the secondary segment in the first computation section upon expiration of the first timer;

4) upon termination of the secondary segment of the first computation section, initiating execution of checking code to compare respective results of execution of the primary and the secondary segments of the first computation section; and 5) providing an error indication if the respective results of the primary and secondary segments of the first computation section are not identical;

wherein execution of the second computation section is performed by the steps of:

1) upon starting of the first temporal diversity timer, initiating execution of the primary segment in the second computation section;

2) starting a second temporal diversity timer after the execution of the primary segment in the second computation section;

3) initiating execution of the secondary segment in the second computation section upon expiration of the second timer;

4) upon termination of the secondary segment of the second computation section, initiating execution of checking code to compare respective results of execution of the primary and the secondary segments of the second computation section; and 5) providing an error indication if the respective results of the primary and secondary segments of the second computation section are not identical;

wherein the first and second timers are equal to the average duration of certain events.

10. The method of claim 9, wherein the expiration of the temporal diversity timer indicates the lapse of a period equal to Dmax, which is a predetermined value approximately equal to the average duration of certain external events potentially disruptive to execution of the program.

11. The method of claim 9, wherein the program is divided into a plurality of computation sections, each of which constitute said at least part of the program.

12. The method of claim 11, wherein each of the computation sections takes a set of inputs, performs computations on the inputs, and exposes a set of outputs to further computation.

13. The method of claim 9, wherein the two functionally identical code segments are generated by a compiler.

14. A method for detecting computational errors in a digital processor executing a program on a computer system, the method comprising steps of:

dividing the program into at least three computation sections;

generating two functionally identical code segments respectively comprising a primary segment and a secondary segment, for each of the computation sections;

executing a first, second, and third computation sections by the use of timers to allow overlapped execution of the code segments on the same processor wherein, the execution of the first computation section is performed by the steps of:

1) initiating execution of the primary segment in the first computation section;

2) starting a first temporal diversity timer after the execution of the primary segment in the first computation section;

3) initiating execution of the secondary segment in the first computation section upon expiration of the first timer;

4) upon termination of the secondary segment of the first computation section, initiating execution of checking code to compare respective results of execution of the primary and the secondary segments of the first computation section; and 5) providing an error indication if the respective results of the primary and secondary segments of the first computation section are not identical;

wherein execution of the second computation section is performed by the steps of:

6) upon starting of the first temporal diversity timer, initiating execution of the primary segment in the second computation section;

7) starting a second temporal diversity timer after the execution of the primary segment in the second computation section;

8) initiating execution of the secondary segment in the second computation section upon expiration of the second timer;

9) upon termination of the secondary segment of the second computation section, initiating execution of checking code to compare respective results of execution of the primary and the secondary segments of the second computation section; and 10) providing an error indication if the respective results of the primary and secondary segments of the second computation section are not identical;

wherein execution of the third computation section is performed by the steps of:

11) upon starting of the second temporal diversity timer, initiating execution of the primary segment in the third computation section;

12) starting a third temporal diversity timer after the execution of the primary segment in the third computation section;

13) initiating execution of the secondary segment in the third computation section upon expiration of the third timer;

14) upon termination of the secondary segment of the third computation section, initiating execution of checking code to compare respective results of execution of the primary and the secondary segments of the third computation section; and 15) providing an error indication if the respective results of the primary and secondary segments of the third computation section are not identical;

wherein the first, second, and third timers are equal to the average duration of certain events.

15. The method of claim 14, including repeating steps 6) through 10) for each remaining computation section not previously executed.

16. The method of claim 14, wherein each of the computation sections takes a set of inputs, performs computations on the inputs, and exposes a set of outputs to further computation.

17. The method of claim 14, wherein the two functionally identical code segments are generated by a compiler.

18. The method of claim 14, wherein the expiration of each of the timers respectively indicates the lapse of a period equal to Dmax, which is a predetermined value approximately equal to the average duration of certain external events potentially disruptive to execution of the program.

19. A method for detecting computational errors in a digital processor executing a program on a computer system, the method comprising steps of:

dividing the program into at least three computation sections;

generating two functionally identical code segments respectively comprising a primary segment and a secondary segment, for each of the computation sections;

executing a first, second, and third computation sections by the use of timers to allow overlapped execution of the code segments on the same processor wherein, the execution of the first computation section is performed by the steps of:

1) initiating execution of the primary segment in the first computation section;

2) starting a first temporal diversity timer after the execution of the primary segment in the first computation section;

3) initiating execution of the secondary segment in the first computation section upon expiration of the first timer;

4) upon termination of the secondary segment of the first computation section, initiating execution of checking code to compare respective results of execution of the primary and the secondary segments of the first computation section; and 5) providing an error indication if the respective results of the primary and secondary segments of the first computation section are not identical;

wherein execution of the second computation section is performed by the steps of:

6) upon starting of a third temporal diversity timer, initiating execution of the primary segment in the second computation section;
7) starting a second temporal diversity timer after the execution of the primary segment in the second computation section;
8) initiating execution of the secondary segment in the second computation section upon expiration of the second timer;
9) upon termination of the secondary segment of the second computation section, initiating execution of checking code to compare respective results of execution of the primary and the secondary segments of the second computation section; and
10) providing an error indication if the respective results of the primary and secondary segments of the second computation section are not identical;
wherein execution of the third computation section is performed by the steps of:
11) upon starting of the second temporal diversity timer, initiating execution of the primary segment in the third computation section;
12) starting a third temporal diversity timer after the execution of the primary segment in the third computation section;
13) initiating execution of the secondary segment in the third computation section upon expiration of the third timer;
14) upon termination of the secondary segment of the third computation section, initiating execution of checking code to compare respective results of execution of the primary and the secondary segments of the third computation section; and
15) providing an error indication if the respective results of the primary and secondary segments of the third computation section are not identical;
wherein the first, second, and third timers are equal to the average duration of certain events.

20. The method of claim 19, including repeating steps 6) through 10) for each remaining computation section not previously executed.

21. The method of claim 19, wherein each of the computation sections takes a set of inputs, performs computations on the inputs, and exposes a set of outputs to further computation.

22. The method of claim 19, wherein the two functionally identical code segments are generated by a compiler.

23. The method of claim 19, wherein the expiration of each of the timers respectively indicates the lapse of a period equal to Dmax, which is a predetermined value approximately equal to the average duration of certain external events potentially disruptive to execution of the program.

24. A method for detecting computational errors in a digital processor executing a program on a computer system, the method comprising steps of:
dividing the program into at least three computation sections;
generating two functionally identical code segments respectively comprising a primary segment and a secondary segment, for each of the computation sections;
providing a plurality of temporal diversity timers, each comprising:
a start instruction for designating the start of a computation domain; and
a check timer instruction for providing a predetermined delay in the execution of the program by determining when to continue execution, executing a first, second, and third computation sections by the use of timers to allow overlapped execution of the code segments on the same processor wherein, the execution of the first computation section is performed by the steps of:
1) initiating execution of the primary segment in the first computation section;
2) starting a first temporal diversity timer after the execution of the primary segment in the first computation section by invoking a start instruction of the first timer;
3) initiating execution of the secondary segment in the first computation section upon expiration of the first timer based on the check timer instruction of the first timer;
4) upon termination of the secondary segment of the first computation section, initiating execution of checking code to compare respective results of execution of the primary and the secondary segments of the first computation section; and
5) providing an error indication if the respective results of the primary and secondary segments of the first computation section are not identical;
wherein execution of the second computation section is performed by the steps of:
6) upon starting of the first temporal diversity timer, initiating execution of the primary segment in the second computation section;
7) starting a second temporal diversity timer after the execution of the primary segment in the second computation section by invoking a start instruction of the second timer;
8) initiating execution of the secondary segment in the second computation section upon expiration of the second timer based on the check timer instruction of the second timer;
9) upon termination of the secondary segment of the second computation section, initiating execution of checking code to compare respective results of execution of the primary and the secondary segments of the second computation section; and
10) providing an error indication if the respective results of the primary and secondary segments of the second computation section are not identical;
wherein execution of the third computation section is performed by the steps of:
11) upon starting of the second temporal diversity timer, initiating execution of the primary segment in the third computation section;
12) starting a third temporal diversity timer after the execution of the primary segment in the third computation section by invoking a start instruction of the third timer;
13) initiating execution of the secondary segment in the third computation section upon expiration of the third timer based on the check timer instruction of the third timer;
14) upon termination of the secondary segment of the third computation section, initiating execution of checking code to compare respective results of execution of the primary and the secondary segments of the third computation section; and
15) providing an error indication if the respective results of the primary and secondary segments of the third computation section are not identical;
wherein the first, second, and third timers are equal to the average duration of certain events.

25. The method of claim 19, including repeating steps 6) through 10) for each remaining computation section not previously executed.

26. The method of claim 24, wherein each of the computation sections takes a set of inputs, performs computations on the inputs, and exposes a set of outputs to further computation.

27. The method of claim 24, wherein the two functionally identical code segments are generated by a compiler.

28. The method of claim 24, wherein the expiration of each of the timers respectively indicates the lapse of a period equal to Dmax, which is a predetermined value approximately equal to the average duration of certain external events potentially disruptive to execution of the program.

29. A compiler-implemented instruction pair, executable via software on a digital processor of a computer system, for detecting computational errors in execution of a program by the digital processor, comprising:
   means for dividing the program into a plurality of computation sections;
   a plurality of temporal diversity timers, each comprising:
      a start instruction for designating the start of a computation domain; and
      a check timer instruction for providing a predetermined delay in the execution of the program by determining when to continue execution; means for generating and executing two functionally identical code segments, respectively comprising a primary segment and a secondary segment, for each of the computation sections by the use of timers to allow overlapped execution of the code segments on the same processor wherein, the execution of a first computation section comprises:
   1) execution means for initiating execution of the primary segment in the first computation section;
   2) means for starting a first temporal diversity timer after the execution of the primary segment in the first computation section by invoking a start instruction of the first timer;
   3) execution means for initiating execution of the secondary segment in the first computation section upon expiration of the first timer based on the check timer instruction of the first timer;
   4) upon termination of the secondary segment of the first computation section, means for initiating execution of checking code to compare respective results of execution of the primary and the secondary segments of the first computation section; and
   5) means for providing an error indication if the respective results of the primary and secondary segments of the first computation section are not identical;
   wherein execution of a second computation section comprises:
   1) upon starting of the first temporal diversity timer, means for initiating execution of the primary segment in the second computation section;
   2) means for starting a second temporal diversity timer after the execution of the primary segment in the second computation section by invoking a start instruction of the second timer;
   3) execution means for initiating execution of the secondary segment in the second computation section upon expiration of the second timer based on the check timer instruction of the second timer;
   4) upon termination of the secondary segment of the second computation section, means for initiating execution of checking code to compare respective results of execution of the primary and the secondary segments of the second computation section; and
   5) means for providing an error indication if the respective results of the primary and secondary segments of the second computation section are not identical;
   wherein the first and second timers are equal to the average duration of certain events.

30. The instruction pair of claim 29, wherein the predetermined delay is approximately equal to a value of Dmax that has elapsed since the execution of the wait instruction;
   wherein Dmax is a predetermined value approximately equal to the average duration of certain external events potentially disruptive to execution of the program.

31. The instruction pair of claim 30, wherein the predetermined delay is approximately equal to the execution time of a specific number of CPU cycles for the processor on which the program runs.

32. The instruction pair of claim 29, wherein the start and wait instructions specify a unique tag corresponding to each computation section to allow calculations from unrelated computational domains to be overlapped.

33. A compiler-implemented instruction pair, executable via software on a digital processor of a computer system, for detecting computational errors in execution of a program by the digital processor, comprising:
   means for dividing the program into a plurality of computation sections;
   a temporal diversity timer comprising:
      a start means for designating the start of a computation domain; and
      a check timer means for providing a predetermined delay in the execution of the program;
   means for generating and executing two functionally identical code segments, respectively comprising a primary segment and a secondary segment, for each of the computation sections, by the use of timers to allow overlapped execution of the code segments on the same digital processor wherein, the execution of a first computation section comprises:
   1) execution means for initiating execution of the primary segment in the first computation section;
   2) means for starting a first temporal diversity timer after the execution of the primary segment in the first computation section by invoking a start instruction of the first timer;
   3) execution means for initiating execution of the secondary segment in the first computation section upon expiration of the first timer based on the check timer instruction of the first timer;
   4) upon termination of the secondary segment of the first computation section, means for initiating execution of checking code to compare respective results of execution of the primary and the secondary segments of the first computation section; and
   5) means for providing an error indication if the respective results of the primary and secondary segments of the first computation section are not identical;
   wherein execution of a second computation section comprises:
   1) upon starting of the first temporal diversity timer, means for initiating execution of the primary segment in the second computation section;
   2) means for starting a second temporal diversity timer after the execution of the primary segment in the second computation section by invoking a start instruction of the second timer;
   3) execution means for initiating execution of the secondary segment in the second computation section upon expiration of the second timer based on the check timer instruction of the second timer;
   4) upon termination of the secondary segment of the second computation section, means for initiating execution of checking code to compare respective results of execution of the primary and the secondary segments of the second computation section; and 5) means for providing an error indication if the respective results of the primary and secondary segments of the second computation section are not identical;

wherein execution of a third computation section comprises:

1) upon starting of the second temporal diversity timer, means for initiating execution of the primary segment in the third computation section;

2) means for starting a third temporal diversity timer after the execution of the primary segment in the third computation section by invoking a start instruction of the third timer;

3) execution means for initiating execution of the secondary segment in the third computation section upon expiration of the third timer based on the check timer instruction of the third timer;

4) upon termination of the secondary segment of the third computation section, means for initiating execution of checking code to compare respective results of execution of the primary and the secondary segments of the third computation section; and 5) means for providing an error indication if the respective results of the primary and secondary segments of the third computation section are not identical;

wherein the first, second, and third timers are equal to the average duration of certain events.

* * * * *